(12) United States Patent
Munshi et al.

(10) Patent No.: US 10,747,519 B2
(45) Date of Patent: *Aug. 18, 2020

(54) LANGUAGE, FUNCTION LIBRARY, AND COMPILER FOR GRAPHICAL AND NON-GRAPHICAL COMPUTATION ON A GRAPHICAL PROCESSOR UNIT

(71) Applicant: Apple Inc., Cupertino, CA (US)

(72) Inventors: Aaftab A. Munshi, Los Gatos, CA (US); Kenneth C. Dyke, Los Altos, CA (US); Rahul U. Joshi, Sunnyvale, CA (US); Richard W. Schreyer, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,637

(22) Filed: Aug. 6, 2019

(65) Prior Publication Data

US 2019/0361687 A1 Nov. 28, 2019

Related U.S. Application Data

(63) Continuation of application No. 14/627,786, filed on Feb. 20, 2015, now Pat. No. 10,430,169.

(60) Provisional application No. 62/005,646, filed on May 30, 2014.

(51) Int. Cl.
*G06F 8/54* (2018.01)
*G06F 8/41* (2018.01)

(52) U.S. Cl.
CPC ............... *G06F 8/54* (2013.01); *G06F 8/41* (2013.01); *G06F 8/427* (2013.01)

(58) Field of Classification Search
CPC ............... G06F 8/54; G06F 8/41; G06F 8/427
See application file for complete search history.

(56) References Cited

U.S. PATENT DOCUMENTS

| 5,179,702 | A | 1/1993 | Spix |
| 5,313,614 | A | 5/1994 | Goettelmann |
| 5,724,590 | A | 3/1998 | Goettelmann |
| 6,058,438 | A | 5/2000 | Diehl |
| 6,665,688 | B1 * | 12/2003 | Callahan, II ........ G06F 16/2322 |

(Continued)

FOREIGN PATENT DOCUMENTS

| CN | 101425175 A | 5/2009 |
| CN | 102027446 A | 4/2011 |

(Continued)

OTHER PUBLICATIONS

"Metal Programming Guide Contents," Mar. 9, 2015 (Mar. 9, 2015), pp. 1-74, XP055207633, Retrieved from the Internet: URL: https://developer.apple.com/library/ios/documentation/Miscellaneous/Conceptual/MetalProgrammingGuide/MetalProgrammingGuide.pdf [retrieved on Aug. 13, 2015].

(Continued)

*Primary Examiner* — Viva Miller
(74) *Attorney, Agent, or Firm* — Blank Rome LLP

(57) ABSTRACT

A compiler and library provide the ability to compile a programming language according to a defined language model into a programming language independent, machine independent intermediate representation, for conversion into an executable on a target programmable device. The language model allows writing programs that perform data-parallel graphics and non-graphics tasks.

20 Claims, 36 Drawing Sheets

(56) References Cited

U.S. PATENT DOCUMENTS

| | | | |
|---|---|---|---|
| 7,173,623 B2 | 2/2007 | Calkins | |
| 7,434,213 B1 | 10/2008 | Prakash | |
| 7,659,901 B2 | 2/2010 | Toelle | |
| 7,746,347 B1 | 6/2010 | Brown | |
| 7,800,620 B2 | 9/2010 | Tarditi, Jr. | |
| 8,044,951 B1* | 10/2011 | Brown | G06T 15/005 |
| | | | 345/419 |
| 8,149,242 B2 | 4/2012 | Langyel | |
| 8,274,517 B2 | 9/2012 | Boyd | |
| 8,477,143 B2 | 7/2013 | Harper | |
| 8,566,537 B2 | 10/2013 | Ni | |
| 8,595,701 B2 | 11/2013 | Li | |
| 2003/0056083 A1 | 3/2003 | Bates | |
| 2004/0160446 A1 | 8/2004 | Gosalia | |
| 2005/0122330 A1 | 6/2005 | Boyd | |
| 2005/0237330 A1 | 10/2005 | Stauffer | |
| 2006/0012604 A1 | 1/2006 | Seetharamaiah | |
| 2006/0080677 A1 | 4/2006 | Louie | |
| 2006/0098018 A1 | 5/2006 | Tarditi | |
| 2007/0033572 A1 | 2/2007 | Donovan | |
| 2007/0294666 A1 | 12/2007 | Papakipos | |
| 2008/0001952 A1 | 1/2008 | Srinivasan | |
| 2008/0303833 A1 | 12/2008 | Swift | |
| 2009/0125894 A1 | 5/2009 | Nair | |
| 2009/0217249 A1 | 8/2009 | Kim | |
| 2009/0284535 A1 | 11/2009 | Pelton | |
| 2009/0307699 A1 | 12/2009 | Munshi | |
| 2010/0047510 A1 | 2/2010 | Couvillion | |
| 2010/0277486 A1 | 11/2010 | Bhoovaraghavan | |
| 2011/0004827 A1 | 1/2011 | Doerr | |
| 2011/0063296 A1 | 3/2011 | Bolz | |
| 2011/0087864 A1 | 4/2011 | Duluk | |
| 2011/0246973 A1 | 10/2011 | Meijer | |
| 2011/0314444 A1* | 12/2011 | Zhang | G06F 8/45 |
| | | | 717/106 |
| 2011/0314458 A1 | 12/2011 | Zhu | |
| 2012/0131545 A1 | 5/2012 | Linebarger | |
| 2012/0147021 A1 | 6/2012 | Cheng | |
| 2012/0242672 A1 | 9/2012 | Larson | |
| 2013/0007703 A1 | 1/2013 | Auerbach | |
| 2013/0141443 A1* | 6/2013 | Schmit | G06F 8/41 |
| | | | 345/505 |
| 2013/0159630 A1 | 6/2013 | Lichmanov | |
| 2013/0169642 A1 | 7/2013 | Frascati | |
| 2013/0187935 A1 | 7/2013 | Wexler | |
| 2013/0198494 A1* | 8/2013 | Grover | G06F 8/53 |
| | | | 712/226 |
| 2013/0265309 A1 | 10/2013 | Goel | |
| 2014/0040855 A1 | 2/2014 | Wang | |
| 2014/0053161 A1 | 2/2014 | Sadowski | |
| 2014/0337321 A1 | 11/2014 | Coyote | |
| 2014/0354658 A1 | 12/2014 | Dotsenko | |
| 2014/0362093 A1 | 12/2014 | Lorach | |
| 2015/0109293 A1 | 4/2015 | Wang | |
| 2015/0179142 A1 | 6/2015 | Lehtinen | |
| 2015/0221059 A1 | 8/2015 | Baker | |
| 2015/0310578 A1 | 10/2015 | You | |
| 2016/0291942 A1 | 10/2016 | Hutchison | |
| 2016/0350245 A1 | 12/2016 | Shen | |

FOREIGN PATENT DOCUMENTS

| | | |
|---|---|---|
| CN | 102099788 A | 6/2011 |
| CN | 102930564 A | 2/2013 |
| CN | 103262038 A | 8/2013 |
| CN | 103392171 A | 11/2013 |
| WO | 2012082423 | 6/2012 |

OTHER PUBLICATIONS

Chris Lattner, "LLVM & LLVM Bitcode Introduction," Jan. 1, 2013 (Jan. 1, 2013), XP055206788, Retrieved from the Internet: URL: http://pllab.cs.nthu.edu.tw/cs240402/lectures/lectures_2013/LLVM Bitcode Introduction.pdf [retrived on Aug. 7, 2015].

Foley et al., "Spark: Modular, Composable Shaders for Graphics Hardware," [Retrieved from the Internet on Mar. 13, 2019] <http://www.cs.cmu.edu/afs/cs.cmu.edu/afs/cs.cmu.edu/academic/class/15869-f11/www/readings/foley11_spark.pdf> 2011.

Helge Rhodin, "A PTX Code Generator for LLVM," Oct. 29, 2010 (Oct. 29, 2010), pp. 1-63, XP055208570, Saarbrucken, Germany, Retrieved from the Internet: URL: http://compilers.cs.uni-saarland.de/publications/theses/rhodin_bsc.pdf [retrieved on Aug. 19, 2015].

Holk, Eric et al.; "GPU Programming in Rust: Implementing High-Level Abstractions in a Systems-Level Language"; IEEE International Symposium on Parallel & Distributed Processing, Workshops and PhD Forum; May 20, 2013; pp. 315-324.

Van Nevraev: "Introduction to Direct3D 12", Apr. 4, 2014 (Apr. 4, 2014), pp. 1-43, XP55203398, Retrieved from the Internet: URL:http://www.google.de/url?sa=t&rct=j&q=&esrc=s&source=web&cd=2&cad=rja&uact=8&ved=0CDEQFjABahUKEwiCmsP_w-hGAhUKPhQKHcqZAP8&url=http%3A%2F%2Famd-dev.wpengine.netdna-cdn.com%2Fwordpress%2Fmedia%2F2012%2F10%2FIntroduction-To-DX12-Ivan-Nevraev.

Kuan-Hsu Chen et al, "An automatic superword vectorization in LLVM," 2010, In 16th Workshop on Compiler Techniques for High-Performance and Embedded Computing, pp. 19-27, Taipei, 2010.

Lattner, Chris, "The Architecture of Open Source Applications: Elegance, Evolution, and a Few Fearless Hacks: LLVM," Mar. 2011, Retrieved from the Internet: URL: http://www.aosabook.org/en/llvm.html [retrieved on Apr. 7, 2014].

LLVM Language Reference Manual, LLVM Project, Apr. 7, 2014, Retrieved from the Internet: URL: http://llvm.org/docs/LangRef.html [retrieved on Apr. 7, 2014].

Matt Sandy: "DirectX 12", Mar. 20, 2014 (Mar. 20, 2014), XP002742458, Retrieved from the Internet: URL: http://blogs.msdn.com/b/directx/archive/2014/03/20/directx-12.aspx [retrieved on Jul. 20, 2015].

McDonnel et al., "Towards Utilizing GPUs in Information Visualization: A Model and Implementation of Image-Space Operation," [Retrieved from the Internet on Mar. 13, 2019] <https://ieeexplore.ieee.org/stamp/stamp.jsp?tp=&arnumber=5290718> 2009.

Miranda et al., "Erbium: A Deterministic, Concurrent Intermediate Representation for Portable and Scalable Performance," [Retrieved from the internet on Mar. 13, 2019] <http://delivery.acm.org/10.1145/1790000/1787312/p119-miranda.pdf?ip=151.207.250.61&id=1787312&acc=ACTIVE%2> 2010.

OpenGL Reference Manual, The Official Reference Document for OpenGL, Release 1, 1994, pp. 1-257.

Shih-Wei Liao, "Android RenderScript on LLVM," Apr. 7, 2011 (Apr. 7, 2011), XP055206785, Retrieved from the Internet: URL: https://events.linuxfoundation.org/slides/2011/lfcs/lfcs2011_llvm_liao.pdf [retrieved on Aug. 7, 2015].

\* cited by examiner

Table 1 Scalar Data Types

| Type | Description |
|---|---|
| bool | A conditional data type that has the value of either `true` or `false`. The value `true` expands to the integer constant 1, and the value `false` expands to the integer constant 0. |
| char int8_t | A signed two's complement 8-bit integer. |
| unsigned char uchar | An unsigned 8-bit integer. |
| short | A signed two's complement 16-bit integer. |
| unsigned short ushort | An unsigned 16-bit integer. |
| int | A signed two's complement 32-bit integer. |
| unsigned int uint | An unsigned 32-bit integer. |
| half | A 16-bit floating-point. The half data type must conform to the IEEE 754 binary16 storage format. |
| float | A 32-bit floating-point. The float data type must conform to the IEEE 754 single precision storage format. |
| double | A 64-bit floating-point. The double data type must conform to the IEEE 754 double precision storage format. |
| size_t | An unsigned integer type of the result of the `sizeof` operator. This is a 64-bit unsigned integer. |
| ptrdiff_t | A signed integer type that is the result of subtracting two pointers. This is a 64-bit signed integer. |
| void | The `void` type comprises an empty set of values; it is an incomplete type that cannot be completed. |

Table 2 Sampler State Enumeration Values

| Enum Name | Valid Values | Description |
|---|---|---|
| coord | normalized (default)<br>pixel | Specifies whether the texture coordinates when sampling or reading from a texture are normalized or unnormalized values. |
| address | repeat<br>mirrored_repeat<br>clamp_to_edge (default)<br>clamp_to_zero | Sets the addressing mode for all texture coordinates. |
| s_address<br>t_address<br>r_address | repeat<br>mirrored_repeat<br>clamp_to_edge (default)<br>clamp_to_zero | Sets the addressing mode for individual texture coordinates. |
| filter | nearest (default)<br>linear | Sets the magnification and minification filtering modes for texture sampling. |
| mag_filter | nearest (default)<br>linear | Sets the magnification filtering mode for texture sampling. |
| min_filter | nearest (default)<br>linear | Sets the minification filtering mode for texture sampling. |
| mip_filter | none (default) nearest<br>linear | Sets the mipmap filtering mode for texture sampling. If none, then only one level-of-detail is active |
| compare_func | none (default)<br>less<br>lessequal<br>greater<br>greaterequal<br>equal<br>notequal<br>always<br>never | Sets comparison test to use with r texture coordinate for shadow maps. |

FIG. 7

Table 3 Sampler and Filtering Parameters

| Sampler Lod Info | Supported Values |
|---|---|
| minlod | A floating-point value that specifies the lower end of the mipmap range for clamping, where 0 is the largest and most detailed mipmap level, and higher mipmap levels are less detailed. The default value is −FLT_MAX. |
| maxlod | A floating-point value that specifies the upper end of the mipmap range for clamping, where 0 is the largest and most detailed mipmap level, and higher mipmap levels are less detailed. This value must be greater than or equal to minlod. The default value is FLT_MAX. |
| max_anisotropy | An 8-bit signed integer that specifies the maximum anisotropic ratio. The default value is 1. |

Table 4 Alignment of Data Types

| Type | Alignment (in bytes) |
|---|---|
| char, uchar | 1 |
| short, ushort | 2 |
| int, uint | 4 |
| half | 2 |
| float | 4 |
| double | 8 |
| char2, uchar2 | 2 |
| char3, uchar3 | 4 |
| char4, uchar4 | 4 |
| short2, ushort2 | 4 |
| short3, ushort3 | 8 |
| short4, ushort4 | 8 |
| int2, uint2 | 8 |
| int3, uint3 | 16 |
| int4, uint4 | 16 |
| half2 | 4 |
| half3 | 8 |
| half4 | 8 |
| float2 | 8 |
| float3 | 16 |
| float4 | 16 |
| double2 | 16 |
| double3 | 32 |
| double4 | 32 |

*FIG. 8*

Table 5 Alignment of Packed Vector Data Types

| Type | Alignment (in bytes) |
|---|---|
| packed_char2, packed_uchar2 | 1 |
| packed_char3, packed_uchar3 | 1 |
| packed_char4, packed_uchar4 | 1 |
| packed_short2, packed_ushort2 | 2 |
| packed_short3, packed_ushort3 | 2 |
| packed_short4, packed_ushort4 | 2 |
| packed_int2, packed_uint2 | 4 |
| packed_int3, packed_uint3 | 4 |
| packed_int4, packed_uint4 | 4 |
| packed_half2 | 2 |
| packed_half3 | 2 |
| packed_half4 | 2 |
| packed_float2 | 4 |
| packed_float3 | 4 |
| packed_float4 | 4 |
| packed_double2 | 8 |
| packed_double3 | 8 |
| packed_double4 | 8 |

*FIG. 9*

Table 6 Attribute Qualifiers for Vertex and Vertex Fetch Function Input Arguments

| Attribute Qualifier | Corresponding Data Types |
|---|---|
| [[vertex_id]] | ushort or uint |
| [[instance_id]] | ushort or uint |

*FIG. 10*

Table 7 Attribute Qualifiers for Vertex Function Return Type

| Attribute Qualifier | Corresponding Data Types |
|---|---|
| [[clip_distance]] | float or float[n] <br> n must be known at compile time |
| [[point_size]] | float |
| [[position]] | float4 |

FIG. 11

Table 8 Attribute Qualifiers for Fragment Function Input Arguments

| Attribute Qualifier | Corresponding Data Types | Description |
|---|---|---|
| [[color(m)]] | floatn, halfn, intn, or uintn n must be known at compile time | The input value read from a color attachment. The index m indicates which color attachment to read from. |
| [[front_facing]] | bool | This value is true if the fragment belongs to a front-facing primitive. |
| [[point_coord]] | float2 | Two-dimensional coordinates indicating where within a point primitive the current fragment is located. They range from 0.0 to 1.0 across the point. |
| [[position]] | float4 | Describes the window relative coordinate (x, y, z, 1/w) values for the fragment. |
| [[sample_id]] | uint | The sample number of the sample currently being processed. |
| [[sample_mask]] | uint | The set of samples covered by the primitive generating the fragment during multi-sample rasterization. |

FIG. 12

Table 9 Attribute Qualifiers for Fragment Function Return Types

| Attribute Qualifier | Corresponding Data Types |
|---|---|
| [[color(m)]] | floatn, halfn, intn, or uintn<br><br>n must be known at compile time |
| [[depth(depth_qualifier)]] | float |
| [[sample_mask]] | uint |

*FIG. 13*

Table 10 Attribute Qualifiers for Kernel Function Input Arguments

| Attribute Qualifier | Corresponding Data Types |
| --- | --- |
| [[global_id]] | ushort, ushort2, ushort3, uint, uint2, or uint3 |
| [[global_linear_id]] | uint |
| [[global_size]] | ushort, ushort2, ushort3, uint, uint2, or uint3 |
| [[local_id]] | ushort, ushort2, ushort3, uint, uint2, or uint3 |
| [[local_linear_id]] | ushort or uint |
| [[local_size]] | ushort, ushort2, ushort3, uint, uint2, or uint3 |
| [[num_work_groups]] | ushort or uint |
| [[work_group_id]] | ushort, ushort2, ushort3, uint, uint2, or uint3 |
| [[simd_width]] | ushort or uint |

FIG. 14

Table 11 Common Functions in the Standard Library

| Built-in common functions | Description |
|---|---|
| `T clamp(T x,`<br>`    T minval,`<br>`    T maxval)` | Returns `fmin(fmax(x, minval), maxval)`.<br><br>Results are undefined if `minval > maxval`. |
| `T mix(T x,`<br>`    T y,`<br>`    T a)` | Returns the linear blend of x and y implemented as:<br>  `x + (y - x) * a`<br><br>a must be a value in the range 0.0 ... 1.0. If a is not in the range 0.0 ... 1.0, the return values are undefined. |
| `T sign(T x)` | Returns 1.0 if x > 0, -0.0 if x = -0.0, +0.0 if x = +0.0, or -1.0 if x < 0. Returns 0.0 if x is a NaN. |
| `T smoothstep(`<br>`    T edge0,`<br>`    T edge1,`<br>`    T x)` | Returns 0.0 if x <= `edge0` and 1.0 if x >= `edge1` and performs a smooth Hermite interpolation between 0 and 1 when `edge0` < x < `edge1`. This is useful in cases where you want a threshold function with a smooth transition.<br><br>This is equivalent to:<br><br>`t = clamp((x - edge0)/`<br>`        (edge1 - edge0),`<br>`        0, 1);`<br>`return t * t * (3 - 2 * t);`<br><br>Results are undefined if `edge0` >= `edge1` or if x, `edge0`, or `edge1` is a NaN. |
| `T step(T edge, T x)` | Returns 0.0 if x < edge, otherwise it returns 1.0. |

FIG. 15

Table 12 Integer Functions in the Standard Library

| Built-in integer functions | Description |
|---|---|
| T abs(T x) | Returns \| x \|. |
| T absdiff(T x, T y) | Returns \| x - y \| without modulo overflow. |
| T addsat(T x, T y) | Returns x + y and saturates the result. |
| T clamp(T x,<br>　　　T minval,<br>　　　T maxval) | Returns<br>min(max(x, minval), maxval).<br><br>Results are undefined if minval > maxval. |
| T clz(T x) | Returns the number of leading 0-bits in x, starting at the most significant bit position. If x is 0, returns the size in bits of the type of x or component type of x, if x is a vector |
| T ctz(T x) | Returns the count of trailing 0-bits in x. If x is 0, returns the size in bits of the type of x or component type of x, if x is a vector. |
| T hadd(T x, T y) | Returns (x + y) >> 1. The intermediate sum does not modulo overflow. |
| T madhi(T a, T b, T c) | Returns mul_hi(a, b) + c. |
| T madsat(T a, T b, T c) | Returns a * b + c and saturates the result. |
| T max(T x, T y) | Returns y if x < y, otherwise it returns x. |
| T min(T x, T x) | Returns y if y < x, otherwise it returns x. |
| T mulhi(T x, T y) | Computes x * y and returns the high half of the product of x and y. |
| T popcount(T x) | Returns the number of non-zero bits in x. |
| T rhadd(T x, T y) | Returns (x + y + 1) >> 1. The intermediate sum does not modulo overflow. |
| T rotate(T v, T i) | For each element in v, the bits are shifted left by the number of bits given by the corresponding element in i. Bits shifted off the left side of the element are shifted back in from the right. |
| T subsat(T x, T y) | Returns x - y and saturates the result. |

*FIG. 16*

Table 13 Relational Functions in the Standard Library

| Built-in relational functions | Description |
|---|---|
| `bool all(Tb x)` | Returns true only if all components of x are true. |
| `bool any(Tb x)` | Returns true only if any component of x are true. |
| `Tb isfinite(T x)` | Test for finite value. |
| `Tb isinf(T x)` | Test for infinity value (positive or negative). |
| `Tb isnan(T x)` | Test for a NaN. |
| `Tb isnormal(T x)` | Test for a normal value. |
| `Tb isordered(T x, T y)` | Test if arguments are ordered. `isordered()` takes arguments x and y and returns the result (x == x) && (y == y). |
| `Tb isunordered(T x, T y)` | Test if arguments are unordered. `isunordered()` takes arguments x and y and returns true if x or y is NaN and false otherwise. |
| `Tb not(Tb x)` | Returns the component-wise logical complement of x. |
| `T select(T a, T b, Tb c)`<br>`Ti select(Ti a, Ti b, Tb c)` | For each component of a vector type,<br>  `result[i] = c[i] ? b[i]`<br>             `: a[i]`<br><br>For a scalar type,<br>  `result = c ? b : a`. |
| `Tb signbit(T x)` | Test for sign bit. Returns true if the sign bit is set for the floating-point value in x and false otherwise. |

*FIG. 17*

Table 14 Math Functions in the Standard Library

| Built-in math functions | Description |
|---|---|
| T acos(T x) | Arc cosine function. |
| T acosh(T x) | Inverse hyperbolic cosine. |
| T asin(T x) | Arc sine function. |
| T asinh(T x) | Inverse hyperbolic sine. |
| T atan(T y_over_x) | Arc tangent function. |
| T atan2(T y, T x) | Arc tangent of y over x. |
| T atanh(T x) | Hyperbolic arc tangent. |
| T ceil(T x) | Round to integral value using the round to positive infinity rounding mode. |
| T copysign(T x, T y) | Return x with its sign changed to match the sign of y. |
| T cos(T x) | Compute cosine. |
| T cosh(T x) | Compute hyperbolic cosine. |
| T exp(T x) | Compute the base-e exponential of x. |
| T exp2(T x) | Exponential base 2 function. |
| T exp10(T x) | Exponential base 10 function. |
| T fabs(T x) | Compute absolute value of a floating-point number. |
| T fdim(T x, T y) | x - y if x > y, +0 if x is less than or equal to y. |
| T floor(T x) | Round to integral value using the round to negative infinity rounding mode. |
| T fmax(T x, T y) | Returns y if x < y, otherwise it returns x. If one argument is a NaN, fmax() returns the other argument. If both arguments are NaNs, fmax() returns a NaN. |
| T fmin(T x, T y) | Returns y if y < x, otherwise it returns x. If one argument is a NaN, fmin() returns the other argument. If both arguments are NaNs, fmin() returns a NaN |
| T fmod(T x, T y) | Returns x - y * trunc(x/y). |
| T fract(T x) | Returns the fractional part of x which is greater than or equal to 0 or less than 1. |
| T frexp(T x, Ti &exponent) | Extract mantissa and exponent from x. For each component the mantissa returned is a float with magnitude in the interval [1/2, 1) or 0. Each component of x equals mantissa returned * $2^{exp}$ |
| Ti ilogb(T x) | Return the exponent as an integer value. |
| T ldexp(T x, Ti k) | Multiply x by 2 to the power k. |
| T log(T x) | Compute natural logarithm. |
| T log2(T x) | Compute a base 2 logarithm. |
| T log10(T x) | Compute a base 10 logarithm. |
| T modf(T x, T &intval) | Decompose a floating-point number. The modf function breaks the argument x into integral and fractional parts each of which has the same sign as the argument. |

FIG. 18

Table 14 Math Functions in the Standard Library (Cont.)

| Built-in math functions | Description |
|---|---|
| | Returns the fractional value. The integral value is returned in `intval`. |
| `T pow(T x, T y)` | Compute x to the power y. |
| `T rint(T x)` | Round to integral value using round to nearest even rounding mode in floating-point format. |
| `T round(T x)` | Return the integral value nearest to x rounding halfway cases away from zero. |
| `T rsqrt(T x)` | Compute inverse square root. |
| `T sin(T x)` | Compute sine. |
| `T sincos(T x, T &cosval)` | Compute sine and cosine of x. The computed sine is the return value and compute cosine is returned in `cosval`. |
| `T sinh(T x)` | Compute hyperbolic sine. |
| `T sqrt(T x)` | Compute square root. |
| `T tan(T x)` | Compute tangent. |
| `T tanh(T x)` | Compute hyperbolic tangent. |
| `T trunc(T x)` | Round to integral value using the round to zero rounding mode. |

FIG. 19

Table 15 Matrix Functions in the Standard Library

| Built-in matrix functions | Description |
|---|---|
| `T determinant(matrix<T,n>)` | Compute the determinant of the matrix. The matrix must be a square |
| `matrix<T,m,n> transpose(matrix<T,n,m>)` | Transpose a matrix `matrix<T,n,m>`. |

FIG. 20

Table 16 Geometric Functions in the Standard Library

| Built-in geometric functions | Description |
|---|---|
| vec<T,n> cross(vec<T,n> x, vec<T,n> y) | Return the cross product of x and y. n must be 3. |
| T distance(vec<T,n> x, vec<T,n> y) | Return the distance between x and y, i.e. length(x - y) |
| T distance(T x, T y) | |
| T dot(vec<T,n> x, vec<T,n> y) | Return the dot product of x and y, i.e., x[0] * y[0] + x[1] * y[1] + ... |
| vec<T,n> faceforward( vec<T,n> N, vec<T,n> I, vec<T,n> Nref) | If dot(Nref, I) < 0.0 return N, otherwise return -N. |
| T length(vec<T,n> x) | Return the length of vector x, i.e., sqrt(x[0]² + x[1]² + ...) |
| vec<T,n> normalize( vec<T,n> x) | Returns a vector in the same direction as x but with a length of 1. |
| vec<T,n> reflect( vec<T,n> I, vec<T,n> N) | For the incident vector I and surface orientation N, returns the reflection direction: I - 2 * dot(N, I) * N<br>In order to achieve the desired result, N must be normalized. |
| vec<T,n> refract( vec<T,n> I, vec<T,n> N, T eta) | For the incident vector I and surface normal N, and the ratio of indices of refraction eta, return the refraction vector. The input parameters for the incident vector I and the surface normal N must already be normalized to get the desired results. |

Table 17 Thread-Group Synchronization Compute Function in the Standard Library

| Built-in work-group function | Description |
|---|---|
| void thread_group_barrier(mem_flags flags) | All work-items in a thread-group executing the kernel on a processor must execute this function before any work-item is allowed to continue execution beyond the thread_group_barrier. |

Table 18 mem_flags Bit-Fields for thread_group_barrier ()

| mem_flags | Description |
|---|---|
| mem_flags_global | Ensure correct ordering of memory operations to global memory. |
| mem_flags_local | Ensure correct ordering of memory operations to local memory for work-items in a thread_group. |

*FIG. 23*

Table 19 Derivatives Fragment Functions in the Standard Library

| Built-in fragment functions | Description |
|---|---|
| T dfdx(T p) | Returns a high precision partial derivative of the specified value with respect to the screen space x coordinate. |
| T dfdy(T p) | Returns a high precision partial derivative of the specified value with respect to the screen space y coordinate. |
| T fwidth(T p) | Returns the sum of the absolute derivatives in x and y using local differencing for p; i.e. fabs(dfdx(p)) + fabs(dfdy(p)). |

*FIG. 24*

Table 20 Samples Fragment Functions in the Standard Library

| Built-in fragment functions | Description |
|---|---|
| `uint get_num_samples()` | Returns the number of samples for the multi-sampled color attachment. |
| `float2 get_sample_position(uint indx)` | Returns the normalized sample offset (x, y) for a given sample index `indx`. Values of x and y are in [-1.0 ... 1.0]. |

FIG. 25

Table 21 Fragment Flow Control Function in the Standard Library

| Built-in fragment functions | Description |
|---|---|
| `void discard_fragment(void)` | Marks the current fragment as being terminated, and the output of the fragment function for this fragment is discarded. |

FIG. 26

Table 22 Cubemap Face Number

| Face number | Cubemap face |
|---|---|
| 0 | Positive X |
| 1 | Negative X |
| 2 | Positive Y |
| 3 | Negative Y |
| 4 | Positive Z |
| 5 | Negative Z |

FIG. 27

Table 23 Unpack Functions

| Built-in unpack functions | Description |
|---|---|
| `float4 unpack_unorm4x8_to_float(uint x)`<br>`float4 unpack_snorm4x8_to_float(uint x)`<br>`half4 unpack_unorm4x8_to_half(uint x)`<br>`half4 unpack_snorm4x8_to_half(uint x)` | Unpack a 32-bit unsigned integer into four 8-bit signed or unsigned integers and then convert each 8-bit signed or unsigned integer value to a normalized single- or half-precision floating-point value to generate a 4-component vector. |
| `float4 unpack_unorm4x8_srgb_to_float(uint x)`<br>`half4 unpack_unorm4x8_srgb_to_half(uint x)` | Unpack a 32-bit unsigned integer into four 8-bit signed or unsigned integers and then convert each 8-bit signed or unsigned integer value to a normalized single- or half-precision floating-point value to generate a 4-component vector. The r, g, and b color values are converted from sRGB to linear RGB. |
| `float2 unpack_unorm2x16_to_float(uint x)`<br>`float2 unpack_snorm2x16_to_float(uint x)`<br>`half2 unpack_unorm2x16_to_half`[13]`(uint x)`<br>`half2 unpack_snorm2x16_to_half(uint x)` | Unpack a 32-bit unsigned integer into two 16-bit signed or unsigned integers and then convert each 16-bit signed or unsigned integer value to a normalized single- or half-precision floating-point value to generate a 2-component vector. |
| `float4 unpack_unorm10a2_to_float(uint x)`<br>`float3 unpack_unorm565_to_float(ushort x)`<br>`half4 unpack_unorm10a2_to_half(uint x)`<br>`half3 unpack_unorm565_to_half(ushort x)` | Convert a 1010102 (10a2), or 565 color value to the corresponding normalized single- or half-precision floating-point vector. |

FIG. 28

Table 24 Pack Functions

| Built-in pack functions | Description |
|---|---|
| `uint pack_float_to_unorm4x8(float4 x)`<br>`uint pack_float_to_snorm4x8(float4 x)`<br>`uint pack_half_to_unorm4x8(half4 x)`<br>`uint pack_half_to_snorm4x8(half4 x)` | Convert a 4-component vector normalized single- or half-precision floating-point value to four 8-bit integer values and pack these 8-bit integer values into a 32-bit unsigned integer. |
| `uint pack_float_to_srgb_unorm4x8(float4 x)`<br>`uint pack_half_to_srgb_unorm4x8(half4 x)` | Convert a 4-component vector normalized single- or half-precision floating-point value to four 8-bit integer values and pack these 8-bit integer values into a 32-bit unsigned integer. The color values are converted from linear RGB to sRGB. |
| `uint pack_float_to_unorm2x16(float2 x)`<br>`uint pack_float_to_snorm2x16(float2 x)`<br>`uint pack_half_to_unorm2x16(half2 x)`<br>`uint pack_half_to_snorm2x16(half2 x)` | Convert a 2-component vector of normalized single- or half-precision floating-point values to two 16-bit integer values and pack these 16-bit integer values into a 32-bit unsigned integer. |
| `uint pack_float_to_unorm10a2(float4)`<br>`ushort pack_float_to_unorm565(float3)`<br>`uint pack_half_to_unorm10a2(half4)`<br>`ushort pack_half_to_unorm565(half3)` | Convert a 4- or 3-component vector of normalized single- or half-precision floating-point values to a packed, 1010102 or 565 color integer value. |

*FIG. 29*

Table 25 Atomic Operation Function

| key | op | computation |
|---|---|---|
| add | + | addition |
| and | & | bitwise and |
| max | max | compute max |
| min | min | compute min |
| or | \| | bitwise inclusive or |
| sub | - | subtraction |
| xor | ^ | bitwise exclusive or |

FIG. 30

Table 26 Minimum Accuracy of Floating-Point Operations and Functions

| Math Function | Min Accuracy - ULP values |
|---|---|
| x + y | Correctly rounded |
| x - y | Correctly rounded |
| x * y | Correctly rounded |
| 1.0 / x | <= 2.5 ulp for single precision Correctly rounded for double precision |
| x / y | <= 2.5 ulp for single precision Correctly rounded for double precision |
| acos | <= 4 ulp |
| acosh | <= 4 ulp |
| asin | <= 4 ulp |
| asinh | <= 4 ulp |
| atan | <= 5 ulp |
| atan2 | <= 6 ulp |
| atanh | <= 5 ulp |
| ceil | Correctly rounded |
| copysign | 0 ulp |
| cos | <= 4 ulp |
| cosh | <= 4 ulp |
| exp | <= 4 ulp |
| exp2 | <= 4 ulp |
| exp10 | <= 4 ulp |
| fabs | 0 ulp |
| fdim | Correctly rounded |
| floor | Correctly rounded |
| fma | Correctly rounded |
| fmax | 0 ulp |
| fmin | 0 ulp |
| fmod | 0 ulp |

FIG. 31

Table 26 Minimum Accuracy of Floating-Point Operations and Functions (Cont)

| Math Function | Min Accuracy - ULP values |
|---|---|
| fract | Correctly rounded |
| frexp | 0 ulp |
| ilogb | 0 ulp |
| ldexp | Correctly rounded |
| log | <= 4 ulp |
| log2 | <= 4 ulp |
| log10 | <= 4 ulp |
| modf | 0 ulp |
| pow | <= 16 ulp |
| rint | Correctly rounded |
| round | Correctly rounded |
| rsqrt | <= 2 ulp |
| sin | <= 4 ulp |
| sincos | <= 4 ulp |
| sinh | <= 4 ulp |
| sqrt | <= 3 ulp for single precision, Correctly rounded for double precision |
| tan | <= 5 ulp |
| tanh | <= 5 ulp |
| trunc | Correctly rounded |

*FIG. 32*

Table 27 Minimum Accuracy of Operations and Functions with Fast Math Enabled

| Math Function | Min Accuracy - ULP values |
|---|---|
| x + y | Correctly rounded |
| x - y | Correctly rounded |
| x * y | Correctly rounded |
| 1.0 / x | <= 2.5 ulp for x in the domain of $2^{-126}$ to $2^{126}$ |
| x / y | <= 2.5 ulp for x in the domain of $2^{-126}$ to $2^{126}$ |
| acos | <= 5 ulp |
| asin | <= 5 ulp for $|x| >= 2^{-125}$ |
| atan | <= 5 ulp |
| atan2 | Implemented as atan(y / x) |
| cos(x) | For x in the domain [-pi, pi], the maximum absolute error is <= $2^{-13}$ and larger otherwise. |
| exp(x) | <= 3 + floor(fabs(2 * x)) ulp |
| exp2(x) | <= 3 + floor(fabs(2 * x)) ulp |
| exp10(x) | Implemented as exp2(x * log2(10)) |
| fma | Implemented either as a correctly rounded fma or as a multiply and an add both of which are correctly rounded. |
| log(x) | For x in the domain [0.5, 2], the maximum absolute error is <= $2^{-21}$; otherwise the maximum error is <= 3 ulp |
| log2(x) | For x in the domain [0.5, 2], the maximum absolute error is <= $2^{-21}$; otherwise the maximum error is <= 3 ulp |
| log10(x) | Implemented as log2(x) * log10(2) |
| pow(x, y) | Implemented as exp2(x * log2(y)) |
| round(x) | Returns a value equal to the nearest integer to x. The fraction 0.5 is rounded in a direction chosen by the implementation. |
| sin(x) | For x in the domain [-pi, pi], the maximum absolute error is <= $2^{-13}$ and larger otherwise. |
| sincos(x) | ULP values as defined for sin(x) and cos(x) |
| sqrt(x) | Implemented as 1.0 / rsqrt(x) |
| tan(x) | Implemented as sin(x) * (1.0 / cos(x)) |

FIG. 33

Table 28 Rules for Conversion to a Normalized Float Value

| Convert from | Conversion Rule to Normalized Float | Corner Cases |
|---|---|---|
| 8-bit normalized unsigned integer | `float(c) / 255.0` | 0 must convert to 0.0<br>255 must convert to 1.0 |
| 10-bit normalized unsigned integer | `float(c) / 1023.0` | 0 must convert to 0.0<br>1023 must convert to 1.0 |
| 16-bit normalized unsigned integer | `float(c) / 65535.0` | 0 must convert to 0.0<br>65535 must convert to 1.0 |
| 8-bit normalized signed integer | `max(-1.0,`<br>`    float(c)/127.0)` | -128 and -127 must convert to -1.0<br>0 must convert to 0.0<br>127 must convert to 1.0 |
| 16-bit normalized signed integer | `max(-1.0,`<br>`    float(c)/32767.0`<br>`)` | -32768 and -32767 must convert to -1.0<br>0 must convert to 0.0<br>32767 must convert to 1.0 |

FIG. 34

Table 29 Rules for Conversion from Floating-Point to a Normalized Integer Value

| Convert to | Conversion Rule to Normalized Integer |
|---|---|
| 8-bit normalized unsigned integer | result = clamp(f * 255.0f, 0.0f, 255.0f) convert result to a 8-bit unsigned integer |
| 10-bit normalized unsigned integer | result = clamp(f * 1023.0f, 0.0f, 1023.0f) convert result to a 10-bit unsigned integer |
| 16-bit normalized unsigned integer | result = clamp(f * 65535.0f, 0.0f, 65535.0f) convert result to a 16-bit unsigned integer |
| 8-bit normalized signed integer | result = clamp(f * 127.0f, -128.0f, 127.0f) convert result to a 8-bit signed integer |
| 16-bit normalized signed integer | result = clamp(f * 32767.0f, -32768.0f, 32767.0f) convert result to a 16-bit signed integer |

FIG. 35

Table 30 Rules for Conversion between Integer Pixel Data Types

| Convert from | Convert to | Conversion Rule |
|---|---|---|
| 32-bit signed integer | 8-bit signed integer | `result = clamp(val, -128, 127)` convert result to a 8-bit signed integer |
| 32-bit signed integer | 16-bit signed integer | `result = clamp(val, -32768, 32767)` convert result to a 16-bit signed integer |
| 32-bit unsigned integer | 8-bit unsigned integer | `result = clamp(val, 0, 255)` convert result to a 8-bit unsigned integer |
| 32-bit unsigned integer | 16-bit unsigned integer | `result = clamp(val, 0, 65535)` convert result to a 16-bit unsigned integer |

*FIG. 36*

LANGUAGE, FUNCTION LIBRARY, AND COMPILER FOR GRAPHICAL AND NON-GRAPHICAL COMPUTATION ON A GRAPHICAL PROCESSOR UNIT

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

This disclosure relates generally to the field of computer programming. More particularly, but not by way of limitation, it relates to a programming language and compilation system for the programming language for programming kernels for execution on a graphical processor unit.

Graphics processor units (GPUs) have become more and more important for processing data-parallel graphics tasks. Developers have also recognized that non-graphics data-parallel tasks can also be handled by GPUs, taking advantage of their massive parallel capabilities. Vendors and standards organizations have created application programming interfaces (APIs) that make graphics data-parallel tasks easier to program. Similarly, vendors and standards organizations have created different APIs that make compute or non-graphics data-parallel tasks easier to program. However, these high-level APIs have resulted in performance degradation, as well as making combining graphics and compute data-parallel tasks different less convenient, because of the need to use different APIs for each type of task or to write code in languages that are quite different from programming languages such as C++ that developers very commonly use for writing code on the CPU.

SUMMARY

A compiler and library provide the ability to compile a programming language according to a defined language model into a programming language independent, machine independent intermediate representation, for conversion into an executable on a target programmable device. The language model allows writing programs that perform data-parallel graphics and non-graphics tasks.

BRIEF DESCRIPTION OF THE DRAWINGS

FIGS. 5-36 are tables illustrating features of a language model for a programming language according to one embodiment.

DETAILED DESCRIPTION

Figure 1:
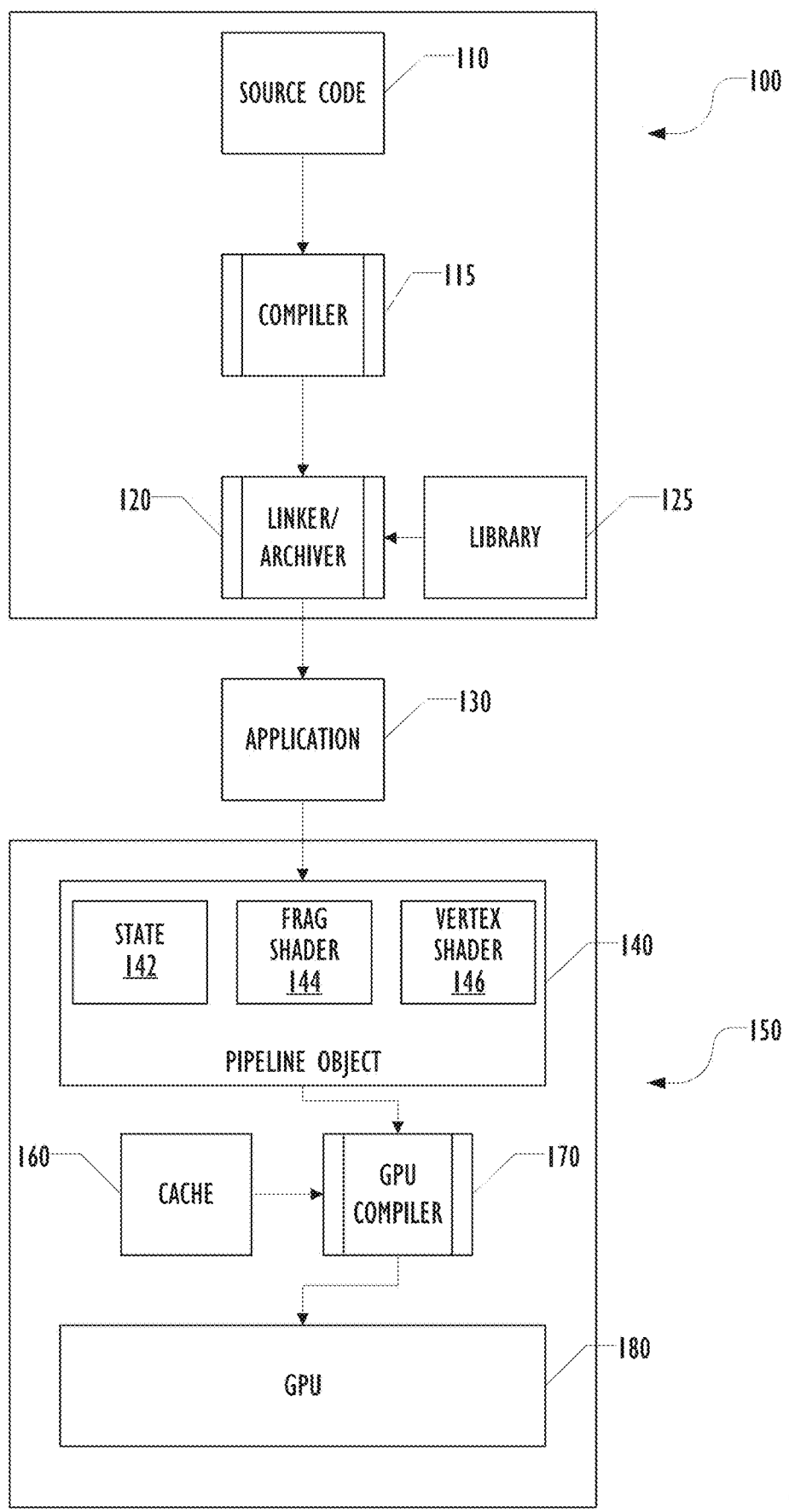
FIG. 1 is a block diagram illustrating compilation, linking, and execution of a program according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, a machine-readable medium can refer to a single physical medium or a plurality of media that may together contain the indicated information stored thereon. A processor can refer to a single processing element or a plurality of processing elements, implemented either on a single chip or on multiple processing chips.

A graphics processor unit (GPU) is a specialized electronic circuit designed to rapidly manipulate and alter memory to accelerate the creation of images in a frame buffer intended for output to a display. A GPU is efficient at manipulating computer graphics and has a highly parallel structure that makes it more efficient than a general-purpose computer processor (CPU) where processing of large blocks of data is done in parallel. GPUs are also used for non-graphical parallel processing, sometimes referred to as "compute processing," in addition to graphics processing.

Embodiments described in more detail below allow software developers to prepare applications using a programming language that complies with a language model that is designed to assist developers to write efficient multi-threaded programs that can perform both graphics and compute (non-graphics) processing on GPUs. The compiler for the programming language generates a machine-independent programming language independent intermediate representation. The developer need not be concerned with the architecture of the specific GPU used, allowing the hardware that on which the program may eventually execute to be changed without requiring the developer to rewrite the program. The intermediate representation may then be distributed without the source code for the program. To allow the program to execute on a target machine, the intermediate representation may be compiled using an embedded compiler for the intermediate representation on the target machine, producing a final executable that can be stored for repeated execution. Alternately, an intermediate system may be used to compile the intermediate representation into a machine-specific executable.

The programming language described in more detail below uses a language model that is unified for compute and graphics functionality and is designed for ahead-of-time compilation. Developers can use the language to write code that is executed on the GPU for graphics and general-purpose data-parallel computations. In one embodiment, the language model and programming language are based on the C++ programming language, with added features for GPU programming of parallel tasks. In one embodiment, the programming language is based on the C++ 11 Specification (a.k.a., the ISO/IEC JTC1/SC22/WG21 N3290 Language Specification) with specific extensions and restrictions. Other embodiments may be based upon other programming languages and language models, such as Objective C.

Traditional compilers break the compilation process into two steps: compile and link. The compiler compiles source code to an object file containing machine code and the linker combines object files with libraries to form an executable program. In a simple system, the linker typically does little more than concatenate the object files and resolve symbol references.

In recent years, however, the compilation process has been split into more phases. The compiler now parses the source code and generates an object code file, but instead of containing machine code specific to a target machine, the object code is in the form of an intermediate representation, a form of virtual instruction set. Typically, the intermediate representation is programming language independent and machine independent, being designed for a hypothetical or virtual machine. An optimizing linker then combines the object files, optimizes them, and integrates them into a native executable for the target machine. The optimizing linker may itself be split into separate phases, so that the optimization is done on the intermediate representation, and the final code generation for the target machine may be performed on a different computer system than the optimization and linking. The linker may be used by multiple compiler phases, allowing a single linker to be used with multiple programming languages.

By having the linker emit an optimized form of the intermediate representation, the creation of the native executable may be pushed to the target system. An embedded compiler on the target system can compile the intermediate representation into native code for direct execution on the target system. This compiler structure allows the developer to write source code in an machine-independent programming language, compile the source code into optimized intermediate representation code, then distribute the intermediate representation code to the target or end-user system for conversion into an executable form. Thus, source code need not be distributed, allowing protection of the source code from the end user system. In addition, if desired, the target machine instead of compiling the intermediate representation ahead of time, then later executing the target-specific executable, a just-in-time compiler or interpreter may be used to allow on-the-fly compilation or interpretation of the intermediate representation at execution time.

Turning now to FIG. 1, a developer computer system 100 and a target computer system 150 are illustrated in block diagram form according to one embodiment. A developer provides source code in the programming language described below to a compiler 115, which parses the source code and generates a machine-independent programming language-independent intermediate representation. The intermediate representation is then provided to a linker/archiver 120 where it may be combined with functions of a library 125 that are used by the program written by the developer. The linker 120 may optimize the intermediate representation into an optimized intermediate representation. The result is a distributable application 130.

The application 130 may be delivered to the target machine 150 in any desired manner, including electronic transport over a network and physical transport of machine-readable media. This generally involves delivery of the application 130 to a server (not shown in FIG. 1) from which the target system 150 may obtain the application 130. The application 130 may be bundled with other data, such as run-time libraries, installers, etc. that may be useful for the installation of the application 130 on the target system 150. In some situations, the application 130 may be provided as part of a larger package of software.

Upon installation of the application 130 as a collection of pipeline objects 140 that contain state information 142, fragment shaders 144, and vertex shaders 146, the application is compiled by an embedded GPU compiler 170 that compiles the intermediate representation into native binary code for the GPU 180, using a cache 160. The compiled native code may be cached in the cache 160 or stored elsewhere in the target system 150. Finally, the GPU 180 may execute the native binary code, performing the graphics and compute kernels for data parallel operations.

Figure 2:
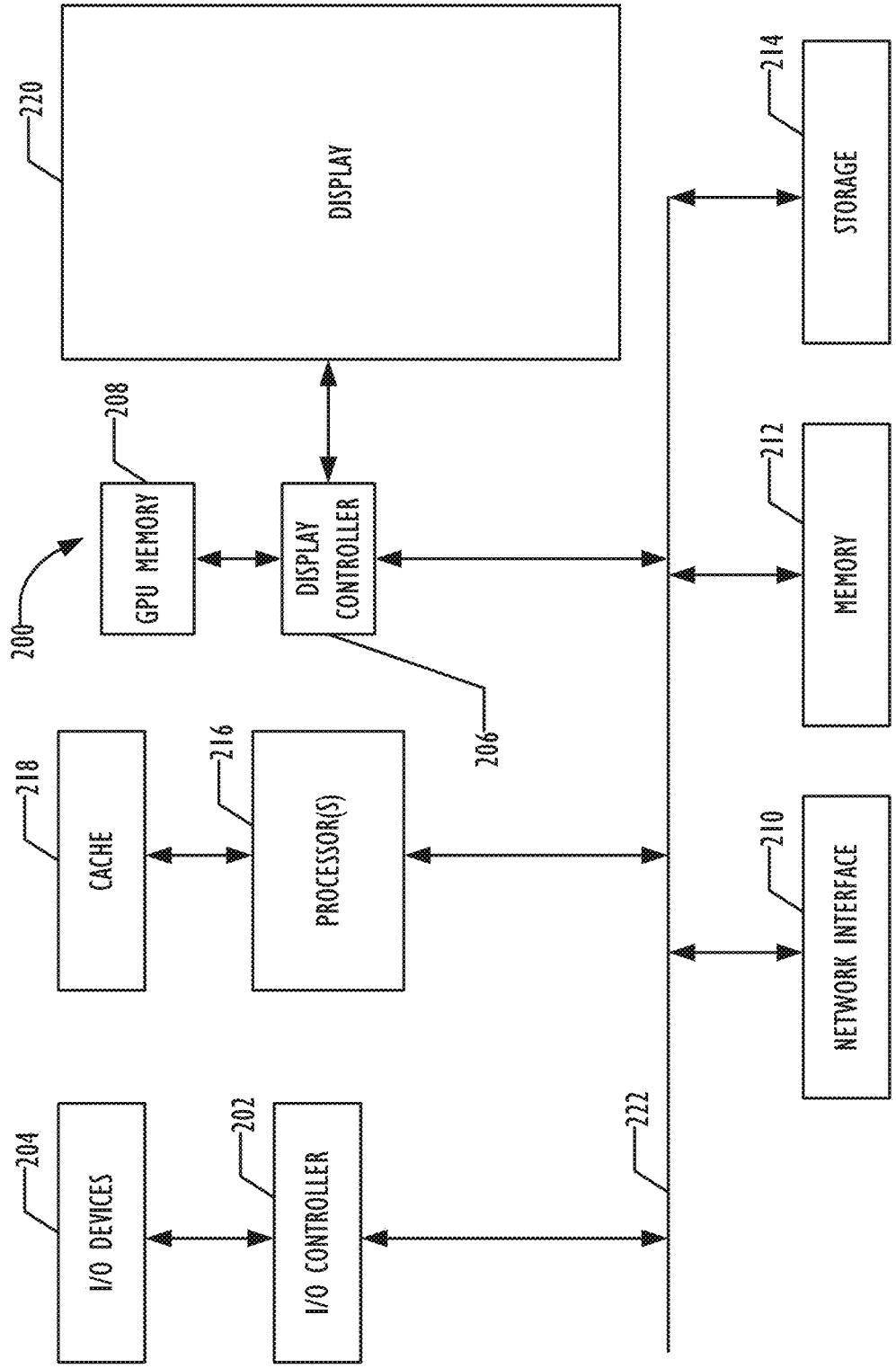
FIG. 2 is a block diagram illustrating a computer system for executing programs on a graphical processor unit according to one embodiment.

Referring now to FIG. 2, a block diagram illustrates a computer system 200 that can serve as the developer system 100 according to one embodiment. While FIG. 2 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, etc.) which have fewer components or perhaps more components may also be used to implement one or more embodiments.

As illustrated in FIG. 2, the computer system 200, which is a form of a data processing system, includes a bus 222 which is coupled to a microprocessor(s) 216, which may be CPUs and/or GPUs, a memory 212, which may include one or both of a volatile read/write random access memory (RAM) and a read-only memory (ROM), and a non-volatile storage device 214. The microprocessor(s) 216 may retrieve instructions from the memory 212 and the storage device 214 and execute the instructions using cache 218 to perform operations described above. The link 222 interconnects these various components together and also interconnects these components 216, 218, 212, and 214 to a display controller 206 and display device 220 and to peripheral devices such as input/output (I/O) devices 204 which may be mice, keyboards, modems, network interfaces, printers and other devices which are well known in the art. Typically, the input/output devices 204 are coupled to the system through input/output controllers 202. Where volatile RAM is included in memory 212, the RAM is typically implemented as dynamic RAM (DRAM), which requires power continually in order to refresh or maintain the data in the memory. The display controller 206 and display device 220 may optionally include one or more GPUs to process display data. Optionally, a GPU memory 208 may be provided to support GPUs included in the display controller 206 or display device 220.

The storage device 214 is typically a magnetic hard drive, an optical drive, a non-volatile solid-state memory device, or other types of memory systems, which maintain data (e.g. large amounts of data) even after power is removed from the system. While FIG. 2 shows that the storage device 214 is a local device coupled directly to the rest of the components in the data processing system, embodiments may utilize a non-volatile memory which is remote from the system, such as a network storage device which is coupled to the data processing system through a network interface 210, which may be a wired or wireless networking interface. The link 222 may include one or more links connected to each other through various bridges, controllers, and/or adapters as is well known in the art. Although only a single element of each type is illustrated in FIG. 2 for clarity, multiple elements of any or all of the various element types may be used as desired.

Figure 3:
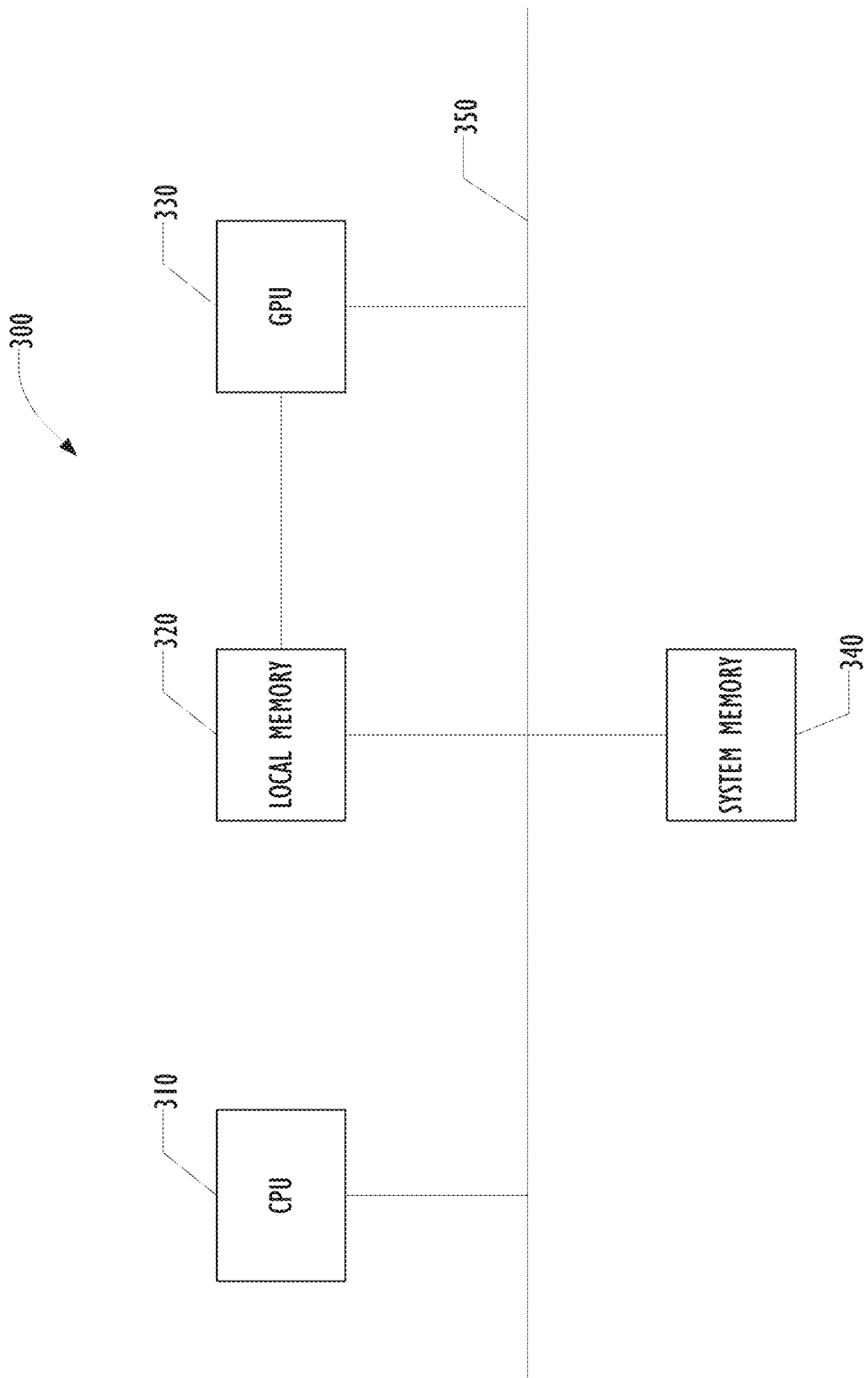
FIG. 3 is a block diagram illustrating a computer system for compiling and linking programs according to one embodiment.

Referring now to FIG. 3, a block diagram illustrates a computing system 300 that can serve as the target computer system 150 according to one embodiment. While FIG. 3 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, etc.) which have fewer components or perhaps more components may also be used to implement one or more embodiments.

Computing system 300 includes a CPU 310, a GPU 330. In the embodiment illustrated in FIG. 3, CPU 310 and GPU 330 are included on separate integrated circuits (ICs) or packages. In other embodiments, however, CPU 310 and GPU 330, or the collective functionality thereof, may be included in a single IC or package.

In addition, computing system 300 also includes a system memory 340 that may be accessed by CPU 310 and GPU 330. In various embodiments, computing system 300 may comprise a supercomputer, a desktop computer, a laptop computer, a video-game console, an embedded device, a handheld device (e.g., a mobile telephone, smart phone, MP3 player, a camera, a GPS device, or other mobile device), or any other device that includes or is configured to include a GPU. Although not illustrated in FIG. 3, computing system 300 may also include conventional elements of a computing system, including a display device (e.g., cathode-ray tube, liquid crystal display, plasma display, etc.) for displaying content (e.g., graphics, video, etc.) of computing system 300, as well as input devices (e.g., keyboard, touch pad, mouse, etc.), storage devices (e.g., hard disc, optical disc, etc.) and communication devices (e.g., network interface). Any other elements may be included as desired. Although illustrated as coupled by a common communication link 350, multiple links 350 may be employed with the CPU 310 and GPU 330 connected to separate but interconnected links 350, as desired.

GPU 330 assists CPU 310 by performing certain special functions, such as graphics-processing tasks and data-parallel, general-compute tasks, usually faster than CPU 310 could perform them in software.

GPU 330 is coupled with CPU 310 and system memory 340 over link 350. Link 350 may be any type of bus or communications fabric used in computer systems, including a peripheral component interface (PCI) bus, an accelerated graphics port (AGP) bus, a PCI Express (PCIE) bus, or another type of link, including non-bus links. If multiple links 350 are employed, they may be of different types.

In addition to system memory 340, computing system 300 may include a local memory 320 that is coupled to GPU 330, as well as to link 350. Local memory 320 is available to GPU 330 to provide access to certain data (such as data that is frequently used) faster than would be possible if the data were stored in system memory 340. Local memory 320 may also be available to CPU 310 to provide access to data such as binaries stored in the local memory 320. In some embodiments, separate local memories may be use for the CPU 310 and GPU 330, instead of sharing a common local memory 320.

Although a single CPU 310 and GPU 330 are illustrated in FIG. 3, embodiments may employ any number of CPUs 310 and GPUs 330 as desired. Where multiple CPUs 310 or GPUs 330 are employed, each of the CPUs 310 and GPUs 330 may be of different types and architectures. Portions of the application 130 may be executed on different GPUs 330 as desired. In addition, the computer system 300 may employ one or more specialized co-processor devices (not illustrated in FIG. 3), such as cryptographic co-processors, which may be coupled to one or more of the CPUs 310 and GPUs 330, using the link 350 or other links as desired.

Figure 4:
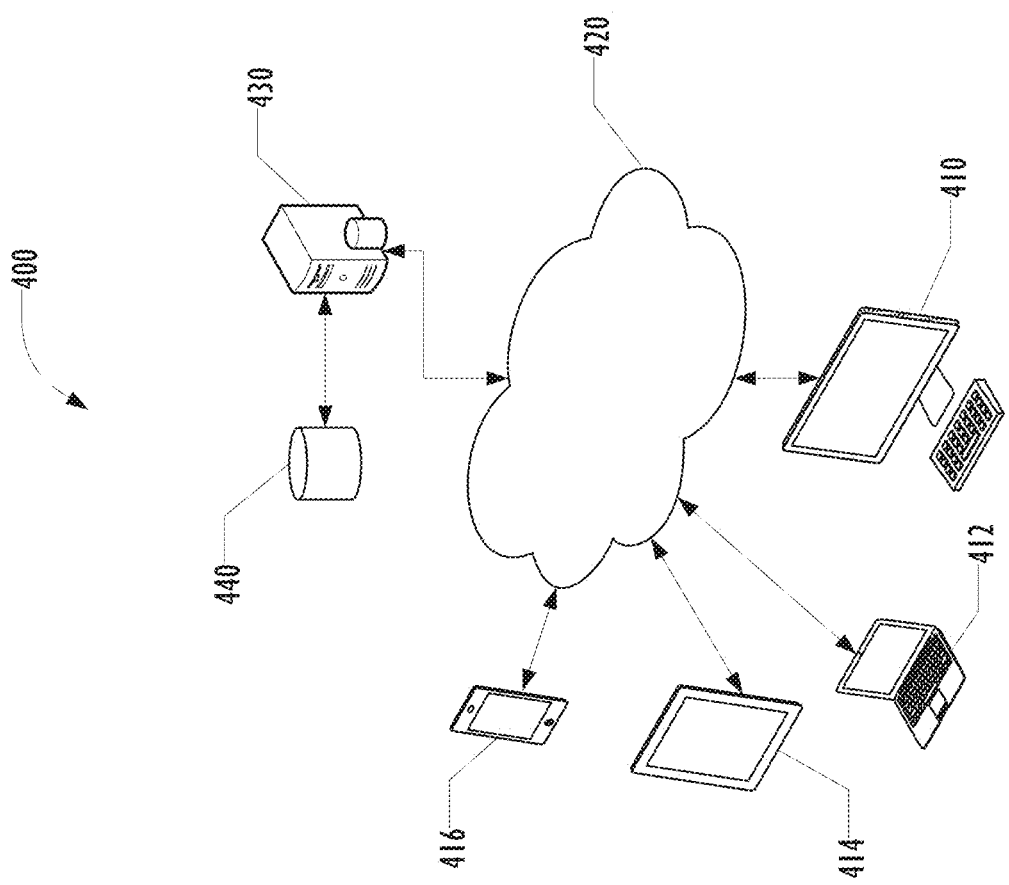
FIG. 4 is a block diagram illustrating a networked system according to one embodiment.

Turning now to FIG. 4, a block diagram illustrates a network of interconnected programmable devices 400, including server 430 and an associated datastore 440, as well as a desktop computer 410, a laptop 412, a tablet 414, and a mobile phone 416. Any of these programmable devices may be the developer system 100 or the target system 150 of FIG. 1. The network 420 that interconnects the programmable devices may be any type of network, wired or wireless, local or wide area, public or private, using any desired network communication protocols for transport of data from one system to the other. Although illustrated as a single network 420, any number of interconnected networks may be used to connect the various programmable devices, which may employ different network technology. In one example, the desktop workstation 410 may be the developer system 100 of FIG. 1, distributing the application 130 to the server 430, which in turn may distribute the application 130 to multiple devices 412, 414, and 416, each of which may employ a different GPU as well as other different components.

We now turn to the programming language and language model. The specific syntax illustrated below for the programming language is an example and by way of illustration only, and different syntax may be used as desired. The programming language complies with a language model that allows developers to use low-level data structures for programming both graphics and compute (non-graphics) data-parallel tasks or kernels on the GPU, without having to worry about the specific GPU that will eventually execute the program. The following description of the programming language and language model is Copyright 2014 Apple Inc.

INTRODUCTION

This document describes language model for a Unified Graphics and Compute Language according to one embodiment. The language is a C++ based programming language that developers can use to write code that is executed on the GPU for graphics and general-purpose data-parallel computations. Since the language is based on C++, developers will find it familiar and easy to use. With the language, both graphics and compute programs can be written with a single, unified language, which allows tighter integration between the two.

The language is designed to work together with a framework, which manages the execution, and optionally the compilation, of the language code. In one embodiment, the framework and development environment uses clang and LLVM so developers get a compiler that delivers close to the metal performance for code executing on the GPU.

Organization of this Description

The description of the language model is organized into the following chapters:

This chapter, "Introduction," is an introduction to this document and covers the similarities and differences between the language and C++ 11.

"Data Types" lists the language data types, including types that represent vectors, matrices, buffers, textures, and samplers. It also discusses type alignment and type conversion.

"Operators" lists the language operators.

"Functions, Variables, and Qualifiers" details how functions and variables are declared, sometimes with qualifiers that restrict how they are used.

"The Standard Library" defines a collection of built-in the language functions.

"Compiler Options" details the options for the language compiler, including pre-processor directives, options for math intrinsics, and options that control optimization.

"Numerical Compliance" describes requirements for representing floating-point numbers, including accuracy in mathematical operations.

The language and C++ 11

The programming language is based on the C++ 11 Specification (a.k.a., the ISO/IEC JTC1/SC22/WG21 N3290 Language Specification), which is incorporated by reference herein in its entirety, with specific extensions and restrictions. Please refer to the C++ 11 Specification for a detailed description of the language grammar.

This section and its subsections describe modifications and restrictions to the C++ 11 language supported in the language.

For more information about the language pre-processing directives and compiler options, see the compiler options section of this document.

Overloading

The language supports overloading as defined by section 13 of the C++ 11 Specification. The function overloading rules are extended to include the address space qualifier of an argument. The language graphics and kernel functions cannot be overloaded. (For definition of graphics and kernel functions, see the Function Qualifiers section of this document.)

Templates

The language supports templates as defined by section 14 of the C++ 11 Specification.

Preprocessing Directives

The language supports the pre-processing directives defined by section 16 of the C++ 11 Specification.

Restrictions

The following C++ 11 features are not available in the language according to one embodiment (section numbers in this list refer to the C++ 11 Specification): lambda expressions (section 5.1.2); dynamic_cast operator (section 5.2.7); type identification (section 5.2.8); new and delete operators (sections 5.3.4 and 5.3.5); noexcept operator (section 5.3.7); derived classes (section 10); member access control (section 11); special member functions (section 12); and exception handling (section 15).

The C++ standard library must not be used in the language code. Instead of the C++ standard library, the language has its own standard library that is discussed in the Standard Library section below.

In one embodiment, the language restricts the use of pointers: Arguments to the language graphics and kernel functions declared in a program that are pointers must be declared with the global, local or constant address space qualifier. (See the Address Space Qualifiers section of this document for more about the language address space qualifiers.) Function pointers are not supported.

Arguments to the language graphics and kernel functions cannot be declared as a pointer to a pointer(s).

Members of a struct or class must belong to the same address space. Bit-field struct members are not supported.

The goto statement is not supported.

Arguments to graphics and kernel functions cannot be declared to be of type size_t, ptrdiff_t, or a struct and/or union that contain members declared to be one of these built-in scalar types.

main is a reserved keyword in the language. A function cannot be called main.

The Pixel and Texel Coordinate System

In the language, the origin of the pixel coordinate system of a framebuffer attachment is defined at the top left corner. Similarly, the origin of the texel coordinate system of a framebuffer attachment is the top left corner.

Data Types

This chapter details the language data types, including types that represent vectors and matrices. Atomic data types, buffers, textures, samplers, arrays, and user-defined structs are also discussed. Type alignment and type conversion are also described.

Scalar Data Types

The language supports the scalar types listed in Table 1 (FIG. 5). In addition to the C++ 11 standard data types, The language also supports:

half-precision floating-point, half

Support for the double data type is optional. The language does not support the C++ 11 standard long, unsigned long, long, unsigned long, and long double data types.

The language supports the C++ 11 standard f or F suffix to specify a single precision floating-point literal value (e.g., 0.5f or 0.5F). In addition, the language supports the h or H suffix to specify a half precision floating-point literal value (e.g., 0.5 h or 0.5H). The language also supports the u or U suffix for unsigned integer literals.

Vector and Matrix Data Types

The language defines its own built-in data types for 2-, 3-, and 4-component vectors of Boolean, integer, and floating-point values. Vectors may be used to represent graphics constructs, such as colors, vertices, surface normals, or texture coordinates, but they are not limited to representing those. The vector type names supported are:

bool n, char n, short n, int n, uchar n, ushort n, uint n, half n, float n, and double n where n is 2, 3, or 4 representing a 2-, 3- or 4-component vector type.

double n is optional. It is supported if double is supported.

The vec<T, n> templated type can also be used to define a vector. T is one of bool, char, short, int, uchar, ushort, uint, half, float, or double. n is 2, 3, or 4.

The language has built-in data types for matrices of floating-point values that have 2, 3, or 4 columns and rows. The supported matrix types are:

half nxm, float nxm, and double nxm where n and m are number of columns and rows. n and m can be 2, 3 or 4. double nxm is optional. It is supported if double is supported.

The following template types can also be used to declare a matrix: matrix<T, n>, where n is both the number of columns and rows, and matrix<T, n, m>, where n and m are number of columns and rows. n and m is one of 2, 3 or 4. T is one of half, float, or double.

Accessing Vector Components

Vector components can be accessed using an array index. Array index 0 refers to the first component of the vector, index 1 to the second component, and so on. The following examples show various ways to access array components:

```
pos=float4 (1.0f, 2.0f, 3.0f, 4.0f);
float x=pos[0]; // x=1.0
float z=pos[2]; // z=3.0
float4 vA=float4 (1.0f, 2.0f, 3.0f, 4.0f);
float4 vB;
for (int i=0; i<4; i++)
vB[i]=vA[i]*2.0f // vB=(2.0, 4.0, 6.0, 8.0);
```

The language supports using the period (.) as a selection operator to access vector components, using letters that may indicate coordinate or color data:

<vector_data_type>.xyzw or
<vector_data_type>.rgba

In the following code, the vector test is initialized, and then components are accessed using the .xyzw or .rgba selection syntax:

```
into test=int4(0, 1, 2, 3);
int a=test.x; // a=0
int b=test.y; // b=1
int c=test.z; // c=2
int d=test.w; // d=3
int e=test.r; // e=0
int f=test.g; // f=1
int g=test.b; // g=2
int h=test.a; // h=3
```

The component selection syntax allows multiple components to be selected.

```
float4 c;
c.xyzw=float4 (1.0f, 2.0f, 3.0f, 4.0f);
c.z=1.0f;c.xy=float2 (3.0f, 4.0f);
c.xyz=float3 (3.0f, 4.0f, 5.0f);
```

The component selection syntax also allows components to be permuted or replicated.

```
float4 pos=float4(1.0f, 2.0f, 3.0f, 4.0f);
float4 swiz=pos.wzyx; // swiz=(4.0f, 3.0f, 2.0f, 1.0f)
float4 dup=pos.xxyy; // dup=(1.0f, 1.0f, 2.0f, 2.0f)
```

The component group notation can occur on the left hand side of an expression. To form the lvalue, swizzling may be applied. The resulting lvalue may be either the scalar or vector type, depending on number of components specified. Each component must be a supported scalar or vector type. The resulting lvalue of vector type must not contain duplicate components.

```
float4 pos=float4(1.0f, 2.0f, 3.0f, 4.0f);
// pos=(5.0, 2.0, 3.0, 6.0)
pos.xw=float2 (5.0f, 6.0f);
// pos=(8.0, 2.0, 3.0, 7.0)
pos.xx=float2 (7.0f, 8.0f);
// pos=(3.0, 5.0, 9.0, 4.0)
pos.xyz=float3 (3.0f, 5.0f, 9.0f);
```

The following methods of vector component access are not permitted and result in a compile-time error in one embodiment:

Accessing components beyond those declared for the vector type is an error. 2-component vector data types can only access .xy or .rg elements. 3-component vector data types can only access .xyz or .rgb elements. For instance:

```
float2 pos;
pos.x=1.0f; // is legal; so is y
pos.z=1.0f; // is illegal; so is w
float3 pos;pos.z=1.0f; // is legal
pos.w=1.0f; // is illegal
```

Accessing the same component twice on the left-hand side is ambiguous; for instance,

```
// illegal—'x' used twice
pos.xx=float2(3.0f, 4.0f);
// illegal—mismatch between float2 and float4
pos.xy=float4(1.0f, 2.0f, 3.0f, 4.0f);
```

The .rgba and .xyzw qualifiers cannot be intermixed in a single access; for instance,

```
float4 pos=float4(1.0f, 2.0f, 3.0f, 4.0f);
pos.x=1.0f; // OK
pos.g=2.0f; // OK
pos.xg=float2(3.0f, 4.0f); // illegal—mixed qualifiers used
float3 coord=pos.ryz; // illegal—mixed qualifiers used
```

A pointer or reference to a vector with swizzles; for instance

```
float4 pos=float4 (1.0f, 2.0f, 3.0f, 4.0f);
my_func(&pos.xy); // illegal
```

The sizeof operator on a vector type returns the size of the vector, which is given as the number of components*size of each component. For example, sizeof(float4) returns 16 and sizeof (half3) returns 6.

Accessing Matrix Components

The floatnxm, halfnxm and doublenxm matrices can be accessed as an array of n floatm, n halfm, or n doublem entries.

The components of a matrix can be accessed using the array subscripting syntax. Applying a single subscript to a matrix treats the matrix as an array of column vectors. The top column is column 0. A second subscript would then operate on the resulting vector, as defined earlier for vectors. Hence, two subscripts select a column and then a row.

```
float4x4 m;
// sets the 2nd column to all 2.0
m[1]=float4(2.0f);
// sets the 1st element of the 1st column to 1.0
m[0] [0]=1.0f;
// sets the 4th element of the 3rd column to 3.0
m[2] [3]=3.0f;
```

Accessing a component outside the bounds of a matrix with a non-constant expression results in undefined behavior. Accessing a matrix component that is outside the bounds of the matrix with a constant expression generates a compile-time error.

Vector Constructors

Constructors can be used to create vectors from a set of scalars or vectors. When a vector is initialized, its parameter signature determines how it is constructed. For instance, if the vector is initialized with only a single scalar parameter, all components of the constructed vector are set to that scalar value.

If a vector is constructed from multiple scalars, one or more vectors, or a mixture of these, the vector's components are constructed in order from the components of the arguments. The arguments are consumed from left to right. Each argument has all its components consumed, in order, before any components from the next argument are consumed.

This is a complete list of constructors that are available for float4:

```
float4 (float x);
float4 (float x, float y, float z, float w);
float4 (float2 a, float2 b);
float4 (float2 a, float b, float c);
float4 (float a, float b, float2 c);
float4 (float a, float2 b, float c);
float4 (float3 a, float b);
float4 (float a, float3 b);
float4 (float4 x);
```

This is a complete list of constructors that are available for float3:

float3 (float x);
    float3 (float x, float y, float z);
    float3 (float a, float2 b);
    float3 (float2 a, float b);
    float3 (float3 x);

This is a complete list of constructors that are available for float2:

float2 (float x);
    float2 (float x, float y);
    float2 (float2 x);

The following examples illustrate uses of the constructors:

float x=1.0f, y=2.0f, z=3.0f, w=4.0f;
    float4 a=float4 (0.0f);
    float4 b=float4 (x, y, z, w);
    float2 c=float2 (5.0f, 6.0f);
    float2 a=float2 (j, k);
    float2 b=float2 (1, m);
    float4 x=float4 (a, b);

Under-initializing a vector constructor is a compile-time error.

Matrix Constructors

Constructors can be used to create matrices from a set of scalars, vectors or matrices. When a matrix is initialized, its parameter signature determines how it is constructed. For example, if a matrix is initialized with only a single scalar parameter, the result is a matrix that contains that scalar for all components of the matrix's diagonal, with the remaining components initialized to 0.0. For example, a call to float4×4 (fval);

constructs a matrix with these initial contents:

| | | | |
|---|---|---|---|
| fval | 0.0 | 0.0 | 0.0 |
| 0.0 | fval | 0.0 | 0.0 |
| 0.0 | 0.0 | fval | 0.0 |
| 0.0 | 0.0 | 0.0 | fval |

A matrix can also be constructed from another matrix that is of the same size, i.e., has the same number of rows and columns. For example, float3×4 (float3×4);

Matrix components are constructed and consumed in column-major order. The matrix constructor must have just enough values specified in its arguments to initialize every component in the constructed matrix object. Providing more arguments than are needed results in an error. Under-initializing a matrix constructor also results in a compile-time error.

A matrix of type T with n columns and m rows can also be constructed from n vec<T, m> vectors. The following examples are legal constructors:

float2×2 (float2, float2);
    float3×3 (float3, float3, float3);
    float3×2 (float2, float2, float2);

The following are examples of matrix constructors that are not supported. A matrix cannot be constructed from multiple scalar values, nor from combinations of vectors and scalars.

// both are bad
    float2×2 (float a00, float a01, float a10, float a11);
    float2×3 (float2 a, float b, float2 c, float d);

Atomic Data Types

The language atomic data type is restricted for use by atomic functions implemented by the programming language, as described in the section on atomic functions. These atomic functions are a subset of the C++ 11 atomic and synchronization functions. The language atomic functions must operate on the language atomic data and must be lock-free.

The atomic types are defined as:
atomic_int and atomic_uint

Buffers

The language implements buffers as a pointer to a built-in or user defined data type described in the global or constant address space. (Refer to the Address Space Qualifiers section for a full description of these address qualifiers.) These buffers can be declared in program scope or passed as arguments to a function.

Examples

```
global float4 *global_buffer;
struct my_user_data {
    float4 a;
    float b;
    int2 c;
};
constant my_user_data *user_data;
```

Textures

The texture data type is a handle to one-, two-, or three-dimensional texture data that corresponds to all or a portion of a single mipmap level of a texture. The following templates define specific texture data types:

enum class access {sample, read, write};
    texture1d<T, access a=access::sample>
    texture1d_array<T, access a=access::sample>
    texture2d<T, access a=access::sample>
    texture2d_array<T, access a=access::sample>
    texture3d<T, access a=access::sample>
    texturecube<T, access a=access::sample>
    texturecube_array<T, access a=access::sample>
    texture2d_ms<T, access a=access::read>
    enum class depth_format {depth_float};
    depth2d<T, access a=access::sample,
        depth_format d=depth_format::depth_float>
    depth2d_array<T, access a=access::sample,
        depth_format d=depth_format::depth_float>
    depthcube<T, access a=access::sample,
        depth_format d=depth_format::depth_float>
    depthcube_array<T, access a=access::sample,
        depth_format d=depth_format::depth_float>
    depth2d_ms<T, access a=access::sample,
        depth_format d=depth_format::depth_float>

T specifies the color type returned when reading from a texture or the color type specified when writing to the texture. For texture types (except depth texture types), T can be half, float, int, or uint. For depth texture types, T must be float.

NOTE: If T is int, the data associated with the texture must use a signed integer format. If T is uint, the data associated with the texture must use an unsigned integer format. If T is half, the data associated with the texture must be either a normalized (signed or unsigned integer) or half precision format. If T is float, the data associated with the texture must be either a normalized (signed or unsigned integer), half or single precision format.

The access qualifier describes how the texture can be accessed. The supported access qualifiers are: sample—The texture object can be sampled. sample implies the ability to read from a texture with and without a sampler; read— Without a sampler, a graphics or kernel function can only read the texture object. (For multi-sampled textures, only the read qualifier is supported.); or write—A graphics or kernel function can write to the texture object.

The depth_format qualifier describes the depth texture format. The only supported value is depth_float. The following example uses these access qualifiers with texture object arguments.

```
void foo (texture2d<float> imgA [[ texture_index(0) ]],
    texture2d<float, access::read> imgB [[ texture_index(1) ]],
    texture2d<float, access::write> imgC [[ texture_index(2) ]])
{
    ...
}
```

(See the Attribute Qualifiers to Locate Resources section for description of the texture_index attribute qualifier.)

Samplers

The sampler type identifies how to sample a texture, including the following sampler state:

addressing mode, including separate addressing modes for the texture coordinates s, t and r.

filter mode, including support for a mag filter, min filter and mip filter.

a Boolean value that indicates whether coordinates are normalized maximum anisotropy value—an integer value between 0 and 16 minimum and maximum levels-of-detail (lod) and mip lod bias, which are all floating point values comparison function (only applicable when used with depth textures)

In one embodiment, an API allows the developer to create a sampler object and pass these as arguments to graphics and kernel functions. A sampler object can also be described in the program source instead of in the API. For these cases we only allow a subset of the sampler state to be specified: the addressing mode, filter mode, and normalized coordinates.

Table 2 (FIG. 6) describes the list of supported sampler state enums and their associated values (and defaults). These states can be specified when a sampler is initialized in the language program source.

Table 3 (FIG. 7) describes the lod sampler state that can be specified with a sampler and their associated values (and defaults). These values cannot be specified when initializing a sampler in the language program source. To specify values for the lod sampler state (other than the defaults), the sampler must be created using an API and passed as an argument to a graphics or kernel function.

The enumeration types used by the sampler data type as described in Table 2 (FIG. 6) are specified as follows:

enum class coord {normalized, pixel};
enum class filter {nearest, linear};
enum class min_filter {nearest, linear};
enum class mag_filter {nearest, linear};
enum class s_address {clamp_to_zero, clamp_to_edge, repeat, mirrored_repeat};
enum class t_address {clamp_to_zero, clamp_to_edge, repeat, mirrored_repeat};
enum class r_address {clamp_to_zero, clamp_to_edge, repeat, mirrored_repeat};
enum class address {clamp_to_zero, clamp_to_edge, repeat, mirrored_repeat};
enum class mip_filter {none, nearest, linear};
// can only be used with depth sampler
enum class compare_func {none, less, less_equal, greater, greater_equal, equal, not_equal, always, never};

The language implements the sampler objects as follows:

```
struct sampler {
public:
    // full version of sampler constructor
    template<typename... Ts>
    constexpr sampler(Ts... sampler_params){ };
private:
};
```

Ts must be the enumeration types listed above that can be used by the sampler data type. If the same enumeration type is declared multiple times in a given sampler constructor, the last listed value will take effect.

The following the language program source illustrates several ways to declare samplers. (The attribute qualifiers (sampler_index(n), buffer_index(n), and texture_index(n)) that appear in the code below are explained in the Attribute Qualifiers section.). Note that samplers or constant buffers declared in program source do not need these attribute qualifiers.

```
constexpr sampler s(coord::pixel,
        address::clamp_to_zero,
        filter::linear);
constexpr sampler a(coord::normalized);
constexpr sampler b(address::repeat);
kernel void
my_kernel(global float4 *p [[ buffer_index(0) ]],
        texture2d<float4> img [[ texture_index(0) ]],
        sampler smp [[ sampler_index(3) ]],
        ...)
{
    ...
}
```

NOTE: Samplers that are initialized in the program source must be declared with the constexpr qualifier.

Arrays and Structs

Arrays and structs are fully supported, including arrays of vectors, matrices, textures, and samplers. The texture and sampler types cannot be declared in a struct.

An array of samplers can be passed as an argument to a function or declared in program scope. The sampler array must be a sized array. The sampler index value must be known at compile time; otherwise, the behavior is undefined. When the sampler index value is not known at compile time, the compiler may throw a compilation error.

Some examples of sampler code are below:

```
kernel void
foo(texture2d<float> img [[ texture_index(0) ]],
    sampler samplers [[ sampler_index(0,10) ]] [10], ....)
{
    int i;
    float2 coord;
    i = compute_index(...);
    // example of indexing sampler array that is supported
    float4 clrA = img.sample(samplers[2],coord);
    // example of indexing sampler array
    // that is not supported - compile time error.
    float4 clrB = img.sample(samplers[i],coord);
}
kernel void
foo(texture2d<float> img,
```

-continued

```
sampler samplers[ ], ....)    // compile error
{
}
```

An array of texture types can only be passed as arguments to a function. The texture array must be a sized array. The texture index value must be known at compile time; otherwise, the behavior is undefined. When the texture index value is not known at compile time, the language compiler may throw a compilation error.

Alignment of Types

Table 4 (FIG. 8) lists the alignment of the scalar and vector data types.

The alignas alignment specifier can be used to specify the alignment requirement of a type or an object. The alignas specifier may be applied to the declaration of a variable or a data member of a struct or class. It may also be applied to the declaration of a struct, class, or enumeration type.

The language compiler is responsible for aligning data items to the appropriate alignment as required by the data type. For arguments to a graphics or kernel function declared a pointer to a data type, the language compiler can assume that the pointer is always appropriately aligned as required by the data type. The behavior of an unaligned load or store is undefined.

Packed Vector Data Types

The vector data types described in the Vector and Matrix Data Types section are aligned to the size of the vector. There are a number of use cases where developers require their vector data to be tightly packed. For example, a vertex struct that may contain position, normal, tangent vectors and texture coordinates tightly packed and passed as a buffer to a vertex or vertex fetch function.

The packed vector types names supported are:
packed_charn, packed_shortn,
packed_intn, packed_ucharn, packed_ushortn, packed_uintn,
packed_halfn, packed_floatn and packed_doublen
n is 2, 3, or 4 representing a 2-, 3- or 4-component vector type. Table 5 (FIG. 9) lists the alignment of the packed vector data types.

Packed vector data types can only be used as a data storage format. Loads and stores from a packed vector_data_type to an aligned vector_data_type and vice-versa, copy constructor and assignment operator are supported. The arithmetic, logical and relational operators are not supported for packed vector data types.

Examples global float4*buffer;
global packed_float4*packed_buffer;
int i;
packed_float4 f (buffer[i]);
pack_buffer[i]=buffer[i];
// operator to convert from packed_float4 to float4.
buffer[i]=float4(packed_buffer[i]);

Implicit Type Conversions

Implicit conversions between scalar built-in types (except void) are supported. When an implicit conversion is done, it is not just a re-interpretation of the expression's value but a conversion of that value to an equivalent value in the new type. For example, the integer value 5 is converted to the floating-point value 5.0.

All vector types are considered to have a higher conversion rank than scalar types. Implicit conversions from a vector type to another vector or scalar type are not permitted and a compilation error results. For example, the following attempt to convert from a 4-component integer vector to a 4-component floating-point vector fails.

int4 i;float4 f=i; // compile error.

Implicit conversions from scalar-to-vector types and scalar-to-matrix types are supported. The scalar value is replicated in each element of the vector. The scalar value is replicated in all components on the matrix's diagonal with the remaining components initialized to 0. The scalar may also be subject to the usual arithmetic conversion to the element type used by the vector or matrix.

For example:
float4 f=2.0f; // f=(2.0f, 2.0f, 2.0f, 2.0f)

Implicit conversions from a matrix type to another matrix, vector or scalar type are not permitted and a compilation error results.

Implicit conversions for pointer types follow the rules described in the C++ 11 Specification.

Type Conversions and Re-interpreting Data

The static_cast operator is used to convert from a scalar or vector type to another scalar or vector type with no saturation and with a default rounding mode (i.e., when converting to floating-point, round to the nearest even number; when converting to integer, round toward zero).

The language adds an as_type<type-id> operator to allow any scalar or vector data type (that is not a pointer) to be reinterpreted as another scalar or vector data type of the same size. The bits in the operand are returned directly without modification as the new type. The usual type promotion for function arguments is not performed.

For example, as_type<float>(0x3f800000) returns 1.0f, which is the value of the bit pattern 0x3f800000 if viewed as an IEEE-754 single precision value. It is an error to use the as_type<type-id> operator to reinterpret data to a type of a different number of bytes.

Examples float f=1.0f;
// Legal. Contains: 0x3f800000
uint u=as_type<uint>(f);
// Legal. Contains:
// (int4) (0x3f800000, 0x40000000,
// 0x40400000, 0x40800000)
float4 f=float4(1.0f, 2.0f, 3.0f, 4.0f);
into i=as_type<int4>(f);int i;
// Legal.
short2 j=as_type<short2>(i);
float4 f;
// Error. Result and operand have different sizes
double4 g=as_type<double4>(f);
float4 f;
// Legal. g.xyz will have same values as f.xyz.
// g.w is undefined
float3 g=as_type<float3>(f);

Operators

This chapter lists and describes the language operators.

Scalar and Vector Operators

The arithmetic operators, add (+), subtract (−), multiply (*) and divide (/), operate on scalar and vector, integer and floating-point data types. All arithmetic operators return a result of the same built-in type (integer or floating-point) as the type of the operands, after operand type conversion. After conversion, the following cases are valid:

The two operands are scalars. In this case, the operation is applied, and the result is a scalar.

One operand is a scalar, and the other is a vector. In this case, the scalar may be subject to the usual arithmetic conversion to the element type used by the vector operand. The scalar type is then widened to a vector that has the same number of components as the vector operand. The operation is performed component-wise, which results in a same size vector.

The two operands are vectors of the same size. In this case, the operation is performed component-wise, which results in a same size vector.

Division on integer types that results in a value that lies outside of the range bounded by the maximum and minimum representable values of the integer type does not cause an exception but results in an unspecified value. Division by zero with integer types does not cause an exception but results in an unspecified value. Division by zero for floating-point types results in ±infinity or NaN, as prescribed by the IEEE-754 standard. (For details about numerical accuracy of floating-point operations, see the section on Numerical Compliance.)

The operator modulus (%) operates on scalar and vector integer data types. All arithmetic operators return a result of the same built-in type (integer or floating-point) as the type of the operands, after operand type conversion. The following cases are valid:

The two operands are scalars. In this case, the operation is applied, and the result is a scalar.

One operand is a scalar, and the other is a vector. In this case, the scalar may be subject to the usual arithmetic conversion to the element type used by the vector operand. The scalar type is then widened to a vector that has the same number of components as the vector operand. The operation is performed component-wise, which results in a same size vector.

The two operands are vectors of the same size. In this case, the operation is performed component-wise, which results in a same size vector.

The resulting value is undefined for any component computed with a second operand that is zero, while results for other components with non-zero operands remain defined.

If both operands are non-negative, the remainder is non-negative. If one or both operands are negative, results are undefined.

The arithmetic unary operators (+ and −) operate on scalar and vector, integer and floating-point types.

The arithmetic post- and pre-increment and decrement operators (−− and ++) operate on scalar and vector integer types. All unary operators work component-wise on their operands. The result is the same type they operated on. For post- and pre-increment and decrement, the expression must be one that could be assigned to (an 1-value). Pre-increment and pre-decrement add or subtract 1 to the contents of the expression they operate on, and the value of the pre-increment or pre-decrement expression is the resulting value of that modification. Post-increment and post-decrement expressions add or subtract 1 to the contents of the expression they operate on, but the resulting expression has the expression's value before the post-increment or post-decrement was executed.

The relational operators greater than (>), less than (<), greater than or equal (>=), and less than or equal (<=) operate on scalar and vector, integer and floating-point types to test whether any or all elements in the result of a vector relational operator test true. For example, to use in the context of an if ( . . . ) statement, see the any and all built-in functions defined in the section on Relational Functions. The result is a Boolean (bool type) scalar or vector. After operand type conversion, the following cases are valid:

The two operands are scalars. In this case, the operation is applied, resulting in a boo 1.

One operand is a scalar, and the other is a vector. In this case, the scalar may be subject to the usual arithmetic conversion to the element type used by the vector operand. The scalar type is then widened to a vector that has the same number of components as the vector operand. The operation is performed component-wise, which results in a Boolean vector.

The two operands are vectors of the same type. In this case, the operation is performed component-wise, which results in a Boolean vector.

The relational operators always return false if either argument is a NaN.

The equality operators, equal (==) and not equal (!=), operate on scalar and vector, integer and floating-point types. All equality operators result in a Boolean (bool type) scalar or vector. After operand type conversion, the following cases are valid:

The two operands are scalars. In this case, the operation is applied, resulting in a boo 1.

One operand is a scalar, and the other is a vector. In this case, the scalar may be subject to the usual arithmetic conversion to the element type used by the vector operand. The scalar type is then widened to a vector that has the same number of components as the vector operand. The operation is performed component-wise, resulting in a Boolean vector.

The two operands are vectors of the same type. In this case, the operation is performed component-wise resulting in a same size Boolean vector.

All other cases of implicit conversions are illegal. If one or both arguments is "Not a Number" (NaN), the equality operator equal (==) returns false. If one or both arguments is "Not a Number" (NaN), the equality operator not equal (!=) returns true.

The bitwise operators and (&), or (|), exclusive or (^), not (~) operate on all scalar and vector built-in types except the built-in scalar and vector floating-point types. For built-in vector types, the operators are applied component-wise. If one operand is a scalar and the other is a vector, the scalar may be subject to the usual arithmetic conversion to the element type used by the vector operand. The scalar type is then widened to a vector that has the same number of components as the vector operand. The operation is performed component-wise resulting in a same size vector.

The logical operators and (&&), or (||) operate on two Boolean expressions. The result is a scalar or vector Boolean.

The logical unary operator not (!) operates on a Boolean expression. The result is a scalar or vector Boolean.

The ternary selection operator (?:) operates on three expressions (exp1 ? exp2:exp3). This operator evaluates the first expression exp1, which must result in a scalar Boolean. If the result is true, it selects to evaluate the second expression; otherwise, it evaluates the third expression. Only one of the second and third expressions is evaluated. The second and third expressions can be any type, as long their types match, or there is a conversion in section 0 that can be applied to one of the expressions to make their types match, or one is a vector and the other is a scalar in which case the scalar is widened to the same type as the vector type. This resulting matching type is the type of the entire expression.

The ones' complement operator (~). The operand must be of a scalar or vector integer type, and the result is the ones' complement of its operand.

The operators right-shift (>>), left-shift (<<) operate on all scalar and vector integer types. For built-in vector types, the operators are applied component-wise. For the right-shift (>>), left-shift (<<) operators, if the first operand is a scalar, the rightmost operand must be a scalar. If the first operand is a vector, the rightmost operand can be a vector or scalar.

The result of E1<<E2 is E1 left-shifted by log 2(N) least significant bits in E2 viewed as an unsigned integer value, where N is the number of bits used to represent the data type of E1, if E1 is a scalar, or the number of bits used to represent the type of E1 elements, if E1 is a vector. The vacated bits are filled with zeros.

The result of E1>>E2 is E1 right-shifted by log 2(N) least significant bits in E2 viewed as an unsigned integer value, where N is the number of bits used to represent the data type of E1, if E1 is a scalar, or the number of bits used to represent the type of E1 elements, if E1 is a vector. If E1 has an unsigned type or if E1 has a signed type and a nonnegative value, the vacated bits are filled with zeros. If E1 has a signed type and a negative value, the vacated bits are filled with ones.

The assignment operator behaves as described by the C++ 11 Specification. For the lvalue=expression assignment operation, if expression is a scalar type and lvalue is a vector type, the scalar is converted to the element type used by the vector operand. The scalar type is then widened to a vector that has the same number of components as the vector operand. The operation is performed component-wise, which results in a same size vector.

NOTE: Operators not described above that are supported by C++ 11 (such as sizeof (T), unary (&) operator, and comma (,) operator) behave as described in the C++ 11 Specification.

Matrix Operators

The arithmetic operators add (+), subtract (−) operate on matrices. Both matrices must have the same numbers of rows and columns. The operation is done component-wise resulting in the same size matrix. The arithmetic operator multiply (*), operates on: a scalar and a matrix, a matrix and a scalar, a vector and a matrix, a matrix and a vector, or a matrix and a matrix.

If one operand is a scalar, the scalar value is multiplied to each component of the matrix resulting in the same size matrix. A right vector operand is treated as a column vector and a left vector operand as a row vector. For vector—matrix, matrix—vector and matrix—matrix multiplication, the number of columns of the left operand is required to be equal to the number of rows of the right operand. The multiply operation does a linear algebraic multiply, yielding a vector or a matrix that has the same number of rows as the left operand and the same number of columns as the right operand.

The examples below presume these vector, matrix, and scalar variables are initialized:
float3 v;
float3×3 m;
float a=3.0f;
The following matrix-to-scalar multiplication
float3×3 m1=m*a;
is equivalent to:
m1 [ 0] [ 0]=m[0] [0]*a;
m1 [0] [1]=m[0] [1]*a;
m1 [0] [2]=m[0] [2]*a;
m1 [1] [0]=m[l] [0]*a;
m1 [1] [1]=m[l] [1]*a;
m1 [1] [2]=m[l] [2]*a;
m1 [2] [0]=m[2] [0]*a;
m1 [2] [1]=m[2] [1]*a;
m1 [2] [2]=m[2] [2]*a;
The following vertex-to-matrix multiplication
float3 u=v*m;
is equivalent to:
u.x=dot (v, m[0]);
u.y=dot (v, m[1]);
u.z=dot(v, m[2]);
The following matrix-to-vertex multiplication
float3 u=m*v;
is equivalent to:
u=v.x*m[0];
u+=v.y*m[1];
u+=v.z*m[2];
The following matrix-to-matrix multiplication
float3×3 m, n, r;
r=m*n;
is equivalent to:
[0]=m[0]*n[0].x;
[0]+=m[1]*n[0].y;
[0]+=m[2]*n[0].z;
[1]=m[0]*n[1].x;
[1]+=m[1]*n[1].y;
[1]+=m[2]*n[1].z;
[2]=m[0]*n[2].x;
[2]+=m[1]*n[2].y;

Functions, Variables, and Qualifiers

This chapter describes how functions, arguments, and variables are declared. It also details how qualifiers are often used with functions, arguments, and variables to specify restrictions.

Function Qualifiers

The language supports the following qualifiers that restrict how a function may be used:

kernel—A data-parallel compute kernel.

vertex_fetch—A fetch shader that reads from resources and returns per-vertex inputs to a vertex shader.

vertex—A vertex shader that is executed for each vertex in the vertex stream and generates per-vertex output.

fragment—A fragment shader that is executed for each fragment in the fragment stream and their associated data and generates per-fragment output.

A vertex shader can also read from resources (buffers and textures) similar to a vertex fetch shader. The vertex fetch shader allows developers to decouple the data types used to declare the per-vertex inputs in the vertex shader from the data types used to declare the vertex data read from resources (such as vertex buffers). By decoupling these data types, a vertex shader can be paired with one or more fetch shaders and vice-versa. When a pipeline object is created using an appropriate API, a vertex fetch shader is optional.

A function qualifier is used at the start of a function, before its return type. The following example shows the syntax for a compute function.

```
kernel void
foo(...)
{
...
}
```

For functions declared with the kernel qualifier, the return type must be void.

Only a graphics function can be declared with one of the vertex fetch, vertex or fragment qualifiers. For graphics functions, the return type identifies whether the output generated by the function is either per-vertex or per-fragment. The return type for a graphics function (except vertex fetch functions) may be void indicating that the function does not generate output.

Functions that use a kernel, vertex fetch, vertex, or fragment function qualifier cannot call functions that also use these qualifiers, or a compilation error results.

Address Space Qualifiers for Variables and Arguments

The language implements address space qualifiers to specify the region of memory where a function variable or argument is allocated. These qualifiers describe disjoint address spaces for variables:

global
local
constant
private

For more details on each, see the relevant section below. All arguments to a graphics or kernel function that are a pointer to a type must be declared with an address space qualifier. For graphics functions, an argument that is a pointer or reference to a type must be declared in the global or constant address space. For kernel functions, an argument that is a pointer or reference to a type must be declared in the global, local, or constant address space. The following example introduces the use of several address space qualifiers. (The local qualifier is supported here for the pointer l_data only if foo is called by a kernel function, as detailed below.

```
void foo (global int *g_data,
    local int *l_data,
    constant float *c_data)
{
    ...
}
```

The address space for a variable at program scope must be constant.

Any variable that is a pointer or reference must be declared with one of the address space qualifiers discussed in this section. If an address space qualifier is missing on a pointer or reference type declaration, a compilation error occurs.

global Address Space

The global address space name refers to buffer memory objects allocated from the global memory pool that are both readable and writeable.

A buffer memory object can be declared as a pointer or reference to a scalar, vector or user-defined struct. The actual size of the buffer memory object is determined when the memory object is allocated via appropriate API calls in the host code.

Some examples are:
// an array of a float vector with 4 components
global float4*color;
struct Foo {
  float a [3];
  int b [2];
}
// an array of Foo elements
global Foo*my_info;

Since texture objects are always allocated from the global address space, the global address qualifier is not needed for texture types. The elements of a texture object cannot be directly accessed. Functions to read from and write to a texture object are provided.

local Address Space

The local address space name is used for variables inside a kernel function that need to be allocated in local memory and are shared by all work-items of a work-group. Variables declared in the local address space cannot be used in graphics functions.

Variables allocated in the local address space inside a kernel function are allocated for each work-group executing the kernel and exist only for the lifetime of the work-group that is executing the kernel.

Variables declared in the local address space inside a kernel function must occur at function scope. In the function example below, the floating-point variable a and the array b are properly allocated in the local address space. However, the floating-point variable c is not declared at function scope, so its declaration is not allowed there. (The qualifier [[local_index (0)]] in the code below is explained in more detail below.)

```
kernel void
my_func(local float *a [[ local_index(0) ]], ...)
{
    // A float allocated in local address space
    local float a;
    // An array of 10 floats allocated in
    // local address space local float b[10];
    if (...)
    {
        // example of variable in local address space
        // but not declared at kernel function scope
        local float c; // error
    }
}
```

Variables allocated in the local address space inside a kernel function cannot be declared and initialized at the same time. In the following example, the variable a is improperly initialized during its declaration, but variable b has its value properly set afterwards.

```
kernel void
my_func(local float *a [[ local_index(0) ]], ...)
{
    local float a = 1;   // not allowed
    local float b;
    b = 1; // allowed}
``` constant Address Space

The constant address space name must be used for variables in program scope, which are allocated in global memory and are accessed inside functions as read-only variables.

Variables in program scope have the same lifetime as the program, and their values persist between calls to any of the compute or graphics functions in the program. In a compute kernel function, read-only variables can be accessed by all (global) work-items of the kernel during its execution.

Variables in program scope must be declared in the constant address space and initialized during the declaration statement. The values used to initialize them must be a compile-time constant. constant float samples[ ]={1.0f, 2.0f, 3.0f, 4.0f};

Pointers or references to the constant address space are allowed as arguments to functions.

Writing to variables declared in the constant address space is a compile-time error. Declaring such a variable without initialization is also a compile-time error.

private Address Space

Variables declared inside a function are in the private address.

Function Arguments and Variables

All inputs, except for initialized variables in the constant address space and samplers declared in program scope, and outputs to a graphics and kernel functions are passed as arguments. Arguments to graphics (vertex and fragment) and kernel functions can be one of the following:

global buffer—a pointer or reference to any data type in the global address space (see the Buffers section above)

constant buffer—a pointer or reference to any data type in the constant address space (see the Buffers section above)

texture object (see the Textures section above)

sampler object (see the Samplers section above)

local buffer (can only be used as arguments with kernel functions)—a pointer to a type in the local address space arrays of constant buffers, global buffers, textures or samplers.

Buffers (global and constant) specified as argument values to a graphics or kernel function cannot alias, i.e. a buffer passed as an argument value cannot overlap another buffer passed to a separate argument of the same graphics or kernel function.

The arguments to these functions are often specified with attribute qualifiers to provide further guidance on their use. Attribute qualifiers are used to specify:

the resource location for the argument (see the Attributes Qualifiers to Locate Resources section below), built-in variables that support communicating data between fixed-function and programmable pipeline stages (see the Attributes Qualifiers for Built-in Variables section below), which data is sent down the pipeline from vertex function to fragment function (see the stage_in Qualifier section below).

Attribute Qualifiers to Locate Resources

For each argument, an attribute qualifier must be specified to identify the location of a resource to use for this argument type. In one embodiment, a framework API uses this attribute to identify the location for the resource.

global and constant buffers—[[buffer_index (slot)]]

texture—[[texture_index(slot)]]

sampler—[[sampler_index(slot)]]

local buffer—[[local_index(slot)]]

arrays—[[buffer_index(slot, count)]], [[texture_index(slot, count)]], or [[sampler_index(slot, count)]].

The slot value is an unsigned integer that identifies the location of a resource that is being assigned. The proper syntax is for the attribute qualifier to follow the argument/variable name.

NOTE: The resource locations are shared between a vertex function and associated vertex fetch functions.

The example below is a simple kernel function, add vectors, that adds an array of two buffers in global address space, inA and inB, and returns the result in the buffer out. The attribute qualifiers (buffer_index (slot)) specify the resource locations for the function arguments.

```
kernel void
    add_vectors(global const float4 *inA [[ buffer_index(0) ]],
        global const float4 *inB [[ buffer_index(1) ]],
        global float4 *out [[ buffer_index(2) ]],
        uint id [[ global_id ]])
{
    out[id] = inA[id] + inB[id];
}
```

The example below shows attribute qualifiers used for function arguments of several different types (a buffer, a texture, and a sampler):

```
kernel void
    my_kernel(global float4 *p [[ buffer_index(0) ]],
        texture2d<float> img [[ texture_index(0) ]],
        sampler sam [[ sampler_index(1) ]] )
{
    ...
}
```

The example below shows attribute qualifiers for function arguments that are array types (a buffer array, a texture array and a sampler array):

```
kernel void
    my_kernel(global float4 *p [[ buffer_index(0), 10 ]] [10],
        texture2d<float> img [[ texture_index(0), 8 ]] [8],
        sampler sam [[ sampler_index(0), 4 ]] [4])
{
    ...
}
```

Vertex function example that specifies resources and outputs to global memory

The following example is a vertex function, render_vertex, which outputs to global memory in the array xform_pos_output, which is a function argument specified with the global qualifier (which was introduced in the global address space section above). All the render_vertex function arguments are specified with resource qualifiers (buffer_index (0), buffer_index (1), buffer_index (2), and buffer_index (3)), as introduced in the Attribute Qualifiers to Locate Resources section above. (The position qualifier shown in this example is discussed in the Attribute Qualifiers for Built-in Variables section below.)

```
struct VertexOutput {
    float4 position [[position]];
    float4 color;
    float2 texcoord;
}
struct VertexInput {
    float4 position;
    float3 normal;
    float2 texcoord;
}
struct LightDesc {
    float4 light_position;
    float4 light_color;
    float4 light_attenuation_factors;
}
vertex VertexOutput
render_vertex(const global VertexInput *v_in
    [[ buffer_index(0) ]],
    constant float4x4 *mvp_matrix [[ buffer_index(1) ]],
    constant LightDesc *light_desc [[ buffer_index(2) ]],
    global float4 * xform_pos_output [[ buffer_index(3) ]],
    uint v_id [[ vertex id ]] )
{
    VertexOutput v out;
```

```
        v_out.position = v_in[v_id].position * mvp_matrix[0];
        v_out.color = do_lighting(v_in[v_id].position,
            v_in[v_id].normal,
            light_desc.get_num_entries( ),
            light_desc);
        v_out.texcoord = v_in[v_id].texcoord;
        // output position to a buffer
        xform_pos_output[v_id] = v_out.position;
        return v_out;
    }
```

Attribute Qualifiers for Built-in Variables

Some graphics operations occur in the fixed-function pipeline stages and need to provide values to or receive values from graphics functions. Built-in input and output variables are used to communicate values between the graphics (vertex and fragment) functions and the fixed-function graphics pipeline stages. Attribute qualifiers are used with arguments and the return type of graphics functions to identify these built-in variables.

Attribute Qualifiers for Vertex or Vertex Fetch Function Input

Table 6 (FIG. 10) lists the built-in attribute qualifiers that can be specified for arguments to a vertex or vertex fetch function and the corresponding data types with which they can be used.

Attribute Qualifiers for Vertex Function Output

Table 7 (FIG. 11) lists the built-in attribute qualifiers that can be specified for a return type of a vertex function or the members of a struct that are returned by a vertex function (and the corresponding data types with which they can be used).

The example below describes a vertex function called process_vertex. The function returns a user-defined struct called VertexOutput, which contains a built-in variable that represents the vertex position, so it requires the [[position]] qualifier.

```
    struct VertexOutput {
        float4 position [[position]];
        float4 color;
        float2 texcoord;
    }
    vertex VertexOutput
    process_vertex(...)
    {
        VertexOutput v_out;
        // compute per-vertex output
        ...
        return v_out;
    }
```

Attribute Qualifiers for Fragment Function Input

Table 8 (FIG. 12) lists the built-in attribute qualifiers that can be specified for arguments of a fragment function (and their corresponding data types).

Note: A vertex function must output a return type that is declared with the position qualifier if there is an associated fragment function.

A variable declared with the [[position]] attribute as input to a fragment function can use one of the following sampling and interpolation qualifiers: center_no_perspective or centroid_no_perspective. For [[color (m)]], m is used to specify the color attachment index when accessing (reading or writing) multiple color attachments in a fragment function. m is optional and can be a value from 0 to 7. If m is not specified, the color attachment index starts at 0. If there is only a single color attachment in a fragment function, then m cannot be used. (See examples of specifying the color attachment in the sections on Per-Fragment Functions and Programmable Blending below.)

Attribute Qualifiers for Fragment Function Output

The return type of a fragment function describes the per-fragment output. A fragment function can output one or more render-target color values, a depth value, and a coverage mask, which must be identified by using the attribute qualifiers listed in Table 9 (FIG. 13). If the depth value is not output by the fragment function, the depth value generated by the rasterizer is output to the depth attachment.

The color attachment index m for fragment output is specified in the same way as it is for [[color (m)]] for fragment input (see discussion for Table 8 (FIG. 12)).

If a fragment function writes a depth value, the depth_qualifier must be specified with one of the following values:
    any
    greater
    less
    unchanged The following example shows how color attachment indices can be specified. Color values written in clr_f write to color attachment index 0, clr_i to color attachment index 1, and clr_ui to color attachment index 2.

```
    struct MyFragmentOutput {
        // color attachment 0
        float4 clr_f [[color(0)]];
        // color attachment 1
        int4 clr_i [[color(1)]];
        // color attachment 2
        uint4 clr_ui [[color(2)]];
    }
    fragment MyFragmentOutput
    my_frag_shader( ... )
    {
        MyFragmentOutput f;
        ...
        f.clr_f = ...;
        ...
        return f;
    }
```

Attribute Qualifiers for Kernel Function Input

Table 10 (FIG. 14) lists the built-in attribute qualifiers that can be specified for arguments to a kernel function and the corresponding data types with which they can be used.

Notes on kernel function attribute qualifiers:

Either the type used to declare [[global_id]], [[global_size]], [[local_id]], [[local_size]] and [[thread_group_id]] must be a scalar type or a vector type. If it is a vector type, the number of components for the vector types used to declare these arguments must match. The data types used to declare [[global_id]] and [[global_size]] must match. The data types used to declare [[local_id]] and [[local_size]] must match. If [[local_id]] or [[local_size]] is declared to be of type uint, uint2 or uint3, [[linear_local_id]] must be declared to be of type uint.

stage_in Qualifier

The per-fragment inputs to a fragment function are generated using the output from a vertex function and the fragments generated by the rasterizer. Similarly, the per-vertex inputs to a vertex function can be generated using the output from a vertex fetch function. The per-fragment or per-vertex inputs:

must be the first argument to the fragment or vertex function, and must be identified using the [[stage_in]] attribute qualifier.

Only one argument of the fragment or vertex function can be declared with the stage_in qualifier. For a user-defined struct declared with the stage_in qualifier, the members of the struct can be: a scalar integer or a scalar floating-point value, a vector of integer or floating-point values, a matrix of integer or floating-point values, or an array of scalars, vectors or matrices (that are or contain integer or floating-point values).

For a complete example of the use of the stage_in qualifier, see below.

Vertex and vertex fetch function example that uses the stage_in qualifier

The following example defines the vertex fetch function fetch_vertex that reads color and position data. fetch_vertex first unpacks and converts the color data into a 4-component vector of half-precision floating-point values. fetch_vertex ultimately returns output (a VertexInput struct per vertex) that is pipelined to be the first argument of the vertex function render_vertex, which uses the [[stage_in]] qualifier.

```
struct VertexOutput {
    float4 position [[position]];
    float4 color;
    float2 texcoord[4];
}
struct VertexInput {
    float4 position;
    half4 color;
    half2 texcoord[4];
}
struct VertexDataInput {
    float4 position;
    uint color;
}
struct LightDesc {
    float4 light_position;
    float4 light_color;
    float4 light_attenuation_factors;
}
constexpr sampler s = sampler(coord::normalized,
            address::clamp_to_border,
            filter::linear);
vertex_fetch VertexInput
fetch_vertex(const global VertexDataInput *in
        [[ buffer_index(0) ]],
        const global half2 *uv [[ buffer_index(1) ]],
        uint v_id [[ vertex_id ]])
{
    VertexInput v_in;
    v_in.position = in[v_id].position;
    v_in.color = unpack_unorm4x8_to_half(in[v_id].color);
    v_in.texcoord[0] = v_in texcoord[1] =
        v_in.texcoord[2] = v_n.texcoord[3] = uv[v_id];
    return v_in;
}
vertex VertexOutput
render_vertex(VertexInput v_in [[ stage_in ]],
        constant float4x4 &mvp_matrix [[ buffer_index(1) ]],
        constant LightDesc *lights [[ buffer_index(2) ]],
        uint v_id [[ vertex_id ]])
{
    VertexOutput v_out;
    v_out.position = v_in.position * mvp_matrix;
    v_out.color = do_lighting(v_in.position,
            v_in.normal,
            lights);
    ...
    return v_out;
}
```

Fragment Function Example that Uses the stage_in Qualifier

An example in a section above previously introduces the process_vertex vertex function, which returns a VertexOutput struct per vertex. In the following example, the output from process_vertex is pipelined to become input for a fragment function called render_pixel, so the first argument of the fragment function uses the [[stage_in]] qualifier and must also be of the incoming VertexOutput type. (In render_pixel, the imgA and imgB 2D textures call the built-in function sample, which is introduced in the section on 2D Texture Functions below.)

```
struct VertexOutput {
    float4 position [[position]];
    float4 color;
    float2 texcoord;
}
struct VertexInput {
    float4 position;
    float3 normal;
    float2 texcoord;
}
struct LightDesc {
    float4 light_position;
    float4 light_color;
    float4 light_attenuation_factors;
}
constexpr sampler s = sampler(coord::normalized,
            address::clamp_to_border,
            filter::linear);
vertex VertexOutput
render_vertex(const global VertexInput *v_in
        [[ buffer_index(0) ]],
        constant float4x4 &mvp_matrix [[ buffer_index(1) ]],
        constant LightDesc *lights [[ buffer_index(2) ]],
        uint v_id [[ vertex_id ]])
{
    VertexOutput v_out;
    v_out.position = v_in[v_id].position * mvp matrix;
    v_out.color = do lighting(v_in[v_id].position,
            v_in[v_id].normal,
            lights.get_num_entries( ),lights);
    v_out.texcoord = v_in[v_id].texcoord;
    return v_out;
}
fragment float4
render_pixel(VertexOutput input [[stage_in]],
        texture2d<float> imgA [[ texture_index(0) ]],
        texture2d<float> imgB [[ texture_index(1) ]])
{
    float4 tex_clr0 = imgA.sample(s, input.texcoord);
    float4 tex_clr1 = imgB.sample(s, input.texcoord);
    // compute color
    float4 dr = compute_color(tex_clr0, tex_clr1, ...);
    return clr;
}
```

Storage Class Specifiers

The language supports the static and extern storage class specifiers. The language does not support the thread_local storage class specifiers. The extern storage-class specifier can only be used for functions and variables declared in program scope or variables declared inside a function. The static storage-class specifier is only for global variables declared in program scope (see the constant address space section) and is not for local variables in graphics or kernel functions. In the following example, the static specifier is incorrectly used by the local variables b and c in a kernel function.

```
extern constant float4 noise_table[256];
static constant float4 color_table[256]; // static is okay
extern kernel void my_foo(texture2d<float> img);
extern void my_bar(global float *a);
kernel void my_func(texture2d<float> img
        [[ texture_index(0) ]],
```

```
        global float *a [[ buffer_index(0) ]])
{
    extern constant float4 a;
    static constant float4 b;   // static is an error.
    static float c;   // static is an error.
    ...
    my_foo(img);
    ...
    my_bar(a);
    ...
}
```

Sampling and Interpolation Qualifiers

Sampling and interpolation qualifiers are only used for return types of vertex functions and arguments to fragment functions. The qualifier determines what sampling method the fragment function uses and how the interpolation is performed, including whether to use perspective-correct interpolation, linear interpolation, or no interpolation.

The sampling and interpolation qualifier can be specified on any structure member declared with the stage_in qualifier. The sampling and interpolation qualifiers supported are:
center_perspective (default except for the [[position]] variable)
center_no_perspective
centroid_perspective
centroid_no_perspective
sample_perspective
sample_no_perspective
flat The following example is user-defined struct that specifies how data in certain members are interpolated:

```
struct VertexOutput {
    float4 pos [[center_no_perspective]];
    float4 color [[center_perspective]];
    float2 texcoord;
    int index [[flat]];
    float f [[sample_perspective]];
}
```

For integer and double types, the only valid interpolation qualifier is flat.

The sampling qualifier variants (sample_perspective and sample_no_perspective) interpolate at a sample location rather than at the pixel center. With one of these qualifiers, the fragment function or code blocks in the fragment function that use these variables execute per-sample rather than per-fragment.

Per-Fragment Function Vs. Per-Sample Function

The fragment function is typically executed per-fragment. The sampling qualifier identifies if any fragment input is to be interpolated at per-sample vs. per-fragment. Similarly, the [[sample_id]] attribute is used to identify the current sample index and the [[color (m)]] attribute is used to identify the destination fragment color or sample color (for a multi-sampled color attachment) value. If any of these qualifiers are used with arguments to a fragment function, the fragment function may execute per-sample instead of per-pixel. The implementation may decide to only execute the code that depends on the per-sample values to execute per-sample and the rest of the fragment function may execute per-fragment. Should be executed on a per-sample basis.

Only the inputs with sample specified (or declared with the [[sample_id]] or [[color (m)]] qualifier) differ between invocations per-fragment or per-sample, whereas other inputs still interpolate at the pixel center.

The following example uses the [[color]] attribute to specify that this fragment function should be executed on a per-sample basis.

```
fragment float4
my_frag_shader(float2 tex_coord [[ stage_in ]],
        texture2d<float> img [[ texture_index(0) ]],
        sampler s [[ sampler_index(0) ]],
        float4 framebuffer [[color(0)]])
{
    return c = mix(img.sample(s, texcoord),
            framebuffer,
            mix factor);
}
```

Programmable Blending

The fragment function can be used to perform per-fragment or per-sample programmable blending. The color attachment index identified by the [[color (m)]] attribute qualifier can be specified as an argument to a fragment function.

Below is a programmable blending example according to one embodiment:

```
fragment half4
paint_grayscale(half4 dst_color [[color(0)]])
{
    // RGB to grayscale
    half lum = dot(dst_color.rgb,
        half3(0.30h, 0.59h, 0.11h);
    return half4(lum, lum, lum, 1.0h);
}
```

Below is a programming blending example for a fragment function according to one embodiment:

```
struct uniform_data {
    half4 u_primaryColor;
    half u_alphaMaskThreshold;
};
fragment half4
my_frag_shader(float2 v_texture [[stage_in]],
        half4 framebuffer [[color(0)]],
        texture2d<half> u_texture [[ texture_index(0) ]],
        sampler s [[ sampler_index(0) ]],
        constant uniform_data &u_data
            [[ buffer_index(0) ]])
{
    half4 mask = u_texture.sample(s, v_texture);
    mask.r = clamp(mask.r * 4.0f – 1.5f, 0.0f, 1.0f);
    // red channel: blend from secondary color (white) to
    // primary color
    half4 color = mix(half4(1.0h),
            u_data.u_primaryColor.rgb, mask.r);
    color = mix(framebuffer.rgb, color.rgb, mask.g);
    color = (framebuffer.a > u_data.u_alphaMaskThreshold)
        ? framebuffer : half4(color, mask.g);
    return color;
}
```

Graphics Function—Signature Matching

A graphics function signature is a list of parameters that are either input to or output from a graphics function.

Vertex—Fragment Signature Matching

There are two kinds of data that can be passed between a vertex and fragment function: user-defined and built-in variables.

The per-instance input to a fragment function is declared with the [[stage_in]]

qualifier. These are output by an associated vertex function.

Built-in variables are declared with one of the attribute qualifiers defined in section 4.3.2. These are either generated by a vertex function (such as [[position]], [[point_size]], [[clip_distance]]), are generated by the rasterizer (such as [[point_coord]], [[front_facing]], [[sample_id]], [[sample_mask]]) or refer to a framebuffer color value (such as [[color]]) passed as an input to the fragment function.

The built-in variable [[position]] must always be returned. The other built-in variables ([[point_size]], [[clip_distance]]) generated by a vertex function, if needed, must be declared in the return type of the vertex function but cannot be accessed by the fragment function.

Built-in variables generated by the rasterizer or refer to a framebuffer color value may also declared as arguments of the fragment function with the appropriate attribute qualifier.

The attribute [[user(name)]] syntax can also be used to specify an attribute name for any user-defined variables.

A vertex and fragment function are considered to have matching signatures if:

There is no input argument with the [[stage_in]] qualifier declared in the fragment function.

For a fragment function argument declared with [[stage_in]], each element in the type associated with this argument can be one of the following: a built-in variable generated by the rasterizer, a framebuffer color value passed as input to the fragment function, or a user-generated output from a vertex function. For built-in variables generated by the rasterizer or framebuffer color values, there is no requirement for a matching type to be associated with elements of the vertex return type. For elements that are user-generated outputs, the following rules apply:

If the attribute name given by [[user(name)]] is specified for an element, then this attribute name must match with an element in the return type of the vertex function, and their corresponding data types must also match.

If the [[user(name)]] attribute name is not specified, then the argument name and types must match.

Below is an example of compatible signatures:

```
struct VertexOutput
{float4 position [[position]];
  float3 normal;
  float2 texcoord;
}
vertex VertexOutput
my_vertex_shader(...)
{
  VertexOutput v;
  ...
  return v;
}
fragment float4
my_fragment_shader(VertexOutput f [[stage_in]], ...)
{
  float4 clr;
  ...
  return clr;
}
fragment float4
my_fragment_shader2(VertexOutput f [[stage_in]],
    bool is_front_face [[front_facing]],
    ...)
{
  float4 clr;
  ...
  return clr;
}
``` my_vertex_shader and my_fragment_shader or my_vertex_shader and my_fragment_shader2 can be used together to render a primitive. Below is another example of compatible signatures:

```
struct VertexOutput
{
  float4 position [[position]];
  float3 vertex_normal [[user(normal)]];
  float2 texcoord [[user(texturecoord)]];
}
struct FragInput
{
  float3 frag_normal [[user(normal)]];
  float4 position [[position]];
  float4 framebuffer_color [[color(0)]];
  bool is_front_face [[front_facing]];
}
vertex VertexOutput
my_vertex_shader(...)
{
  VertexOutput v;
  ...
  return v;
}
fragment float4
my_fragment_shader(FragInput f [[stage_in]], ...)
{
  float4 clr;
  ...
  return clr;
}
```

Below is another example of compatible signatures:

```
struct VertexOutput
{
  float4 position [[position]];
  float3 normal;
  float2 texcoord;
}
struct FragInput
{
  float4 position [[position]];
  float2 texcoord;
}
vertex VertexOutput
my_vertex_shader(...)
{
  VertexOutput v;
  ...
  return v;
}
fragment float4
my_fragment_shader(FragInput f [[stage_in]], ...)
{
  float4 clr;
  ...
  return clr;
}
```

Below is another example of compatible signatures:

```
struct VertexOutput
{
  float4 position [[position]];
  float3 normal;
  float2 texcoord;
}
vertex VertexOutput
my_vertex_shader(...)
{
  VertexOutput v;
  ...
  return v;
```

-continued

```
}
fragment float4
my_fragment_shader(float4 p [[position]],...)
{
   float4 clr;
   ...
   return clr;
}
```

Below is an example of incompatible signatures:

```
struct VertexOutput
{
   float4 position [[position]];
   float3 normal;
   float2 texcoord;
}
struct FragInput
{
   float4 position [[position]];
   float3 normal;
}
vertex VertexOutput
my_vertex_shader(...)
{
   VertexOutput v;
   ...
   return v;
}
fragment float4
my_fragment_shader(FragInput f [[stage_in]], ...)
{
   float4 clr;
   ...
   return clr;
}
```

Below is another example of incompatible signatures:

```
struct VertexOutput
{
   float4 position [[position]];
   float3 normal [[user::normal]];
   float2 texcoord [[user::texturecoord]];
}
struct FragInput
{
   float3 normal [[user::foo]];
   float4 position [[position]];
}
vertex VertexOutput
my_vertex_shader(...)
{
   VertexOutput v;
   ...
   return v;
}
fragment float4
my_fragment_shader(FragInput f [[stage_in]], ...)
{
   float4 clr;
   ...
   return clr;
}
```

Vertex Fetch—Vertex Signature Matching

A vertex fetch and a vertex function are considered to have matching signatures if the type of the argument to the vertex function declared with the [[stage_in]] qualifier matches the return type of the vertex fetch function. The following restrictions apply:

The return type of a vertex fetch function cannot specify any built-in vertex variables (such as [[position]], [[point_size]], [[clip_distance]]). Any input argument to a vertex fetch function cannot be declared with the [[stage_in]] qualifier.

Additional Attribute Qualifiers

The following additional attributes are supported by the language (besides the ones described in earlier sections).

The [[early_fragment_tests]] qualifier allows fragment functions to enable early_fragment_tests. If this attribute is specified with a fragment function, the per-fragment tests are performed prior to fragment function execution. Otherwise they are performed after fragment function execution. Fragment functions declared with the [[early_fragment_tests]] qualifier cannot output a depth value. The return type of the fragment function cannot contain an element declared with the [[depth(depth_qualifier)]] qualifier, or else a compilation error results.

If the work-group size is specified when the kernel is enqueued, then that work-group size is used. If the work-group size is not specified when a given kernel is enqueued, the [[thread_group_size(x, y, z)]] qualifier specifies the work-group size to use for the kernel.

ADDITIONAL NOTES

Writes to a buffer or a texture by a fragment shader that has been invoked to process fragments or samples not covered by a primitive being rasterized have no effect. This can happen to help calculate derivatives for texture lookups for example.

The Standard Library

This chapter describes the functions supported by the standard library for the programming language according to one embodiment.

Namespace and Header Files

The standard library functions and enums are declared in a language-specific namespace. In addition to the header files described in the standard library functions, the <language_stdlib> header is available and can access all the functions supported by the standard library. (The term "language" in "language_stdlib" may be replaced by a name for the compiler in one embodiment.)

Common Functions

The functions in Table 11 (FIG. 15) are in the standard library and are defined in the header <language_common>. (The term "language" in "language_common" may be replaced by a name for the compiler in one embodiment.) T is one of the scalar or vector floating-point types.

Integer Functions

The integer functions in Table 12 (FIG. 16) are in the standard library and are defined in the header <language_integer>. (The term "language" in "language_integer" may be replaced by a name for the compiler in one embodiment.) T is one of the scalar or vector integer types.

Relational Functions

The relational functions in Table 13 (FIG. 17) are in the standard library and are defined in the header <language_relational>. (The term "language" in "language_relational" may be replaced by a name for the compiler in one embodiment.) T is one of the scalar or vector floating-point types. Ti is one of the scalar or vector integer or boolean types. Tb only refers to the scalar or vector boolean types.

Math Functions

The math functions in Table 14 (FIGS. 18-19) are in the standard library and are defined in the header <language_math>. (The term "language" in "language_math" may be replaced by a name for the compiler in one embodiment.) T is one of the scalar or vector floating-point types. Ti refers only to the scalar or vector integer types.

There are two variants of math functions available: the precise and the fast variants.

The -ffast-math compiler option (refer to the Compiler Options section below) can be used to specify which variant to use when compiling source in the programming language. The precise and fast nested namespaces are also available to allow developers to explicitly select the fast or precise variant of these math functions.

Examples

\*include <language_stdlib>
using namespace language;
float x;
float a=fast::sin(x);// use fast version of sin( )
float b=precise::cos(x); // use precise version of cos( )
Matrix Functions The functions in Table 15 (FIG. 20) are in the standard library and are defined in the header <language_matrix>. (The term "language" in "language_matrix" may be replaced by a name for the compiler in one embodiment.) T is float, half or double.

Example float4×4 mA;
float det=determinant (mA);
Geometric Functions

The functions in Table 16 (FIG. 21) are in the standard library and are defined in the header <language_geometric>. (The term "language" in "language_geometric" may be replaced by a name for the compiler in one embodiment.) T is float, half or double.

Compute Functions

The compute functions in this section and its subsections can only be called from a kernel function and are defined in the header <language_compute>. (The term "language" in "language_compute" may be replaced by a name for the compiler in one embodiment.)

Thread-Group Synchronization Functions

The work-group function in Table 17 (FIG. 22) is supported.

The thread_group_barrier function must be encountered by all work-items in a work-group executing the kernel.

If thread_group_barrier is inside a conditional statement and if any work-item enters the conditional statement and executes the barrier, then all work-items must enter the conditional and execute the barrier.

If thread_group_barrier is inside a loop, for each iteration of the loop, all work-items must execute the thread_group_barrier before any work-items are allowed to continue execution beyond the thread_group_barrier. The thread_group_barrier function also queues a memory fence (reads and writes) to ensure correct ordering of memory operations to local or global memory.

The mem_flags argument in thread_group_barrier is a bit-field that can be set to one or more of the following flags, as described in Table 18 (FIG. 23).

Graphics Functions

This section and its subsections list the set of graphics functions that can be called by a fragment and vertex functions. These are defined in the header <language_graphics>. (The term "language" in "language_graphics" may be replaced by a name for the compiler in one embodiment.)

Fragment Functions

The functions in this section (listed in Table 19 (FIG. 24), Table 20 (FIG. 25), and Table 21 (FIG. 26)) can only be called inside a fragment function (a function declared with the fragment qualifier) or inside a function called from a fragment function. Otherwise the behavior is undefined and may result in a compile-time error.

Fragment Functions—Derivatives

The language includes the functions in Table 19 (FIG. 24) to compute derivatives. T is one of float, float2, float3, float4, half, half2, half3, or half4. NOTE: Derivatives are undefined within non-uniform control flow.

Fragment Functions—Samples

The language includes the following per-sample functions in Table 20 (FIG. 25).

get_num_samples and get_sample_position return the number of samples for the color attachment and the sample offsets for a given sample index. For example, this can be used to shade per-fragment but do the alpha test per-sample for transparency super-sampling.

Fragment Functions—Flow Control

The language function in Table 21 (FIG. 26) is used to terminate a fragment.

Texture Functions

The texture functions are categorized into: sample from a texture, read (sampler-less read) from a texture, gather from a texture, write to a texture, and texture query functions.

These are defined in the header <language_texture>. (The term "language" in "language_texture" may be replaced by a name for the compiler in one embodiment.) The texture sample, sample_compare, gather, and gather_compare functions take an offset argument for a 2D texture, 2D texture array and 3D texture. The offset is an integer value that is applied to the texture coordinate before looking up each texel. This integer value can be in the range −8 to +7. The default value is 0.

Overloaded variants of texture sample and sample_compare functions for a 2D texture, 2D texture array, 3D texture, cubemap and cubemap array are available and allow the texture to be sampled using a bias that is applied to a mip-level before sampling or with user-provided gradients in the x and y direction.

NOTE: The texture sample, sample_compare, gather, and gather_compare functions require that the texture is declared with the sample access qualifier. The texture read functions require that the texture is declared with the sample or read access qualifier. The texture write functions require that the texture is declared with the write access qualifier.

1D Texture

The following built-in functions can be used to sample from a 1D texture.

vec<T,4> sample(sampler s, float coord) const

The following built-in functions can be used to perform sampler-less reads from a 1D texture:

vec<T,4> read(uint coord, uint lod=0) const

The following built-in functions can be used to write to a specific mip-level of a 1D texture.

void write(vec<T,4> color,
    uint coord,
    uint lod=0)

The following built-in 1D texture query functions are provided.

uint get_width (uint lod=0) const
uint get_num_mip_levels( ) const

1D Texture Array

The following built-in functions can be used to sample from a 1D texture array.

```
vec<T,4> sample(sampler s,
    float coord,
    uint array) const
```
The following built-in functions can be used to perform sampler-less reads from a 1D texture array:
```
vec<T,4> read(uint coord,
    uint array,
    uint lod=0) const
```
The following built-in functions can be used to write to a specific mip-level of a 1D texture array.
```
void write (vec<T,4> color,
    uint coord,
    uint array,
    uint lod=0)
```
The following built-in 1D texture array query functions are provided.
```
uint get_width(uint lod=0) const
uint get_array_size( ) const
uint get_num_mip_levels( ) const
```
2D Texture The following data types and corresponding constructor functions are available to specify various sampling options:
```
bias(float value)
level(float lod)
gradient2d (float2 dPdx, float2 dPdy)
```
The following built-in functions can be used to sample from a 2D texture.
```
vec<T,4> sample(sampler s,
    float2 coord,
    int2 offset=int2(0)) const
vec<T,4> sample(sampler s,
    float2 coord,
    lod_options options,
    int2 offset=int2(0)) const
```
lod_options must be one of the following types: bias, level, or gradient2d.

The following built-in functions can be used to perform sampler-less reads from a 2D texture:
```
vec<T,4> read(uint2 coord,
    uint lod=0) const
```
The following built-in functions can be used to write to a 2D texture.
```
void write (vec<T, 4> color,
    uint2 coord,
    uint lod=0)
```
The following built-in functions can be used to do a gather of four samples that would be used for bilinear interpolation when sampling a 2D texture.
```
enum class component {x, y, z, w};
vec<T,4> gather(sampler s,
    float2 coord,
    int2 offset=int2(0),
    component c=component::x) const
```
The following built-in 2D texture query functions are provided.
```
uint get_width (uint lod=0) const
uint get_height (uint lod=0) const
uint get_num_mip_levels( ) const
```
2D Texture Sampling Example The following code shows several uses of the 2D texture sample function, depending upon its arguments.
```
texture2d<float> tex;
sampler s;
float2 coord;
int2 offset;
float lod;
// no optional arguments
float4 clr=tex.sample(s, coord);
// sample using a mip-level
clr=tex.sample (s, coord, level(lod));
// sample with an offset
clr=tex.sample(s, coord, offset);
// sample using a mip-level and an offset
clr=tex.sample(s, coord, level(lod), offset);
```
2D Texture Array The following built-in functions can be used to sample from a 2D texture array.
```
vec<T,4> sample(sampler s,
    float2 coord,
    uint array,int2 offset=int2(0)) const vec<T,4> sample
        (sampler s,
    float2 coord,
    uint array,lod_options options,
    int2 offset=int2(0)) const
```
lod_options must be one of the following types: bias, level, or gradient2d. The following built-in functions can be used to perform sampler-less reads from a 2D texture array:
```
vec<T,4> read(uint2 coord,
    uint array, uint lod=0) const
```
The following built-in functions can be used to write to a 2D texture array.
```
void write (vec<T, 4> color,
    uint2 coord,
    uint array,
    uint lod=0)
```
The following built-in functions can be used to do a gather of four samples that would be used for bilinear interpolation when sampling a 2D texture array.
```
vec<T,4> gather(sampler s,
    float2 coord,
    uint array,
    int2 offset=int2(0),
    component c=component::x) const
```
The following built-in 2D texture array query functions are provided.
```
uint get_width(uint lod=0) const
uint get_height(uint lod=0) const
uint get_array_size( ) const
uint get_num_mip_levels( ) const
```
3D Texture The following data types and corresponding constructor functions are available to specify various sampling options:
```
bias(float value)
level (float lod)
gradient3d(float3 dPdx, float3 dPdy)
```
The following built-in functions can be used to sample from a 3D texture.
```
vec<T,4> sample(sampler s,
    float3 coord,
    int3 offset=int3(0)) const
vec<T,4> sample(sampler s,
    float3 coord,
    lod_options options,
    int3 offset=int3(0)) const
```
lod_options must be one of the following types: bias, level, or gradient3d. The following built-in functions can be used to perform sampler-less reads from a 3D texture:
```
vec<T,4> read(uint3 coord,
    uint lod=0) const
```
The following built-in functions can be used to write to a 3D texture.
```
void write(vec<T,4> color,
    uint3 coord,
    uint lod=0)
```

The following built-in 3D texture query functions are provided.
    uint get_width(uint lod=0) const
    uint get_height(uint lod=0) const
    uint get_depth(uint lod=0) const
    uint get_num_mip_levels ( ) const
Cube-Map Texture
The following data types and corresponding constructor functions are available to specify various sampling options:
    bias(float value)
    level(float lod)
    gradientcube(float3 dPdx, float3 dPdy)
The following built-in functions can be used to sample from a cube-map texture.
    vec<T,4> sample(sampler s,
        float3 coord) const
    vec<T,4> sample(sampler s,
        float3 coord,
        lod_options options) const
lod_options must be one of the following types: bias, level, or gradientcube. The following built-in functions can be used to write to a cube-map texture.
    void write (vec<T, 4> color,
        uint2 coord,
        uint face,
        uint lod=0)
NOTE: Table 22 (FIG. 27) describes the cubemap face and the number used to identify the face.
The following built-in functions can be used to do a gather of four samples that would be used for bilinear interpolation when sampling a cube-map texture.
    vec<T,4> gather(sampler s,
        float3 coord,
        component c=component::x) const
The following built-in cube-map texture query functions are provided.
    uint get_width (uint lod=0) const
    uint get_height (uint lod=0) const
    uint get_num_mip_levels ( ) const
Cube-Map Texture Array [Optional]
The following built-in functions can be used to sample from a cube-map texture array.
    vec<T,4> sample(sampler s,
        float3 coord,
        uint array) const
    vec<T,4> sample(sampler s,
        float3 coord,
        uint array,
        lod_options options) const
lod_options must be one of the following types: bias, level, or gradientcube. The following built-in functions can be used to write to a cube-map texture array.
    void write (vec<T, 4> color,
        uint2 coord,
        uint face,
        uint array,
        uint lod=0)
The following built-in functions can be used to do a gather of four samples that would be used for bilinear interpolation when sampling a cube-map texture array.
    vec<T,4> gather(sampler s,
        float3 coord,
        uint array,
        component c=component::x) const
The following built-in cube-map texture array query functions are provided.
    uint get_width (uint lod=0) const
    uint get_height (uint lod=0) const
    uint get_array_size ( ) const
    uint get_num_mip_levels ( ) const 2D Multi-Sampled Texture
The following built-in functions can be used to perform sampler-less reads from a 2D multi-sampled texture:
    vec<T, 4> read(uint2 coord,
        uint sample) const
The following built-in 2D multi-sampled texture query functions are provided.
    uint get_width( ) const
    uint get_height( ) const
    uint get_num_samples( ) const
2D Depth Texture
The following data types and corresponding constructor functions are available to specify various sampling options:
    bias(float value)
    level(float lod)
    gradient2d(float2 dPdx, float2 dPdy)
The following built-in functions can be used to sample from a 2D depth texture.
    T sample(sampler s,
        float2 coord,
        int2 offset=int2 (0)) const
    T sample(sampler s,
        float2 coord,
        lod_options options,
        int2 offset=int2 (0)) const
lod_options must be one of the following types: bias, level or gradient2d. The following built-in functions can be used to sample from a 2D depth texture and compare a single component against the specified comparison value
    T sample_compare (sampler s,
        float2 coord,
        float compare_value,
        int2 offset=int2 (0)) const
    T sample_compare (sampler s,
        float2 coord,
        float compare_value,
        lod_options options,
        int2 offset=int2 (0)) const
lod_options must be one of the following types: bias, level or gradient2d. T must be afloat type. The following built-in functions can be used to perform sampler-less reads from a 2D depth texture:
    T read(uint2 coord,
        uint lod=0) const
The following built-in functions can be used to write to a 2D depth texture.
    void write (T depth,
        uint2 coord,
        uint lod=0)
The following built-in functions can be used to do a gather of four samples that would be used for bilinear interpolation when sampling a 2D depth texture.
    vec<T,4> gather(sampler s,
        float2 coord,
        int2 offset=int2(0)) const
The following built-in functions can be used do a gather of four samples that would be used for bilinear interpolation when sampling a 2D depth texture and comparing these samples with a specified comparison value.
    vec<T,4> gather_compare(sampler s,
        float2 coord,
        float compare_value,
        int2 offset=int2(0)) const
T must be a float type. The following built-in 2D depth texture query functions are provided.
    uint get_width(uint lod=0) const
    uint get_height(uint lod=0) const
    uint get_num_mip_levels ( ) const 2D Depth Texture Array The following built-in functions can be used to sample from a 2D depth texture array.

```
T sample(sampler s,
    float2 coord,
    uint array,
    int2 offset=int2(0)) const
T sample(sampler s,
    float2 coord,
    uint array,lod_options options,
    int2 offset=int2(0)) const
``` lod_options must be one of the following types: bias, level or gradient2d. The following built-in functions can be used to sample from a 2D depth texture array and compare a single component against the specified comparison value

```
T sample_compare(sampler s,
    float2 coord,
    uint array,
    float compare_value,
    int2 offset=int2 (0)) const
T sample_compare(sampler s,
    float2 coord,
    uint array,
    float compare_value,
    lod_options options,
    int2 offset=int2 (0)) const
``` lod_options must be one of the following types: bias, level or gradient2d. T must be afloat type. The following built-in functions can be used to perform sampler-less reads from a 2D depth texture array:

```
T read(uint2 coord,
    uint array,
    uint lod=0) const
```

The following built-in functions can be used to write to a 2D depth texture array.

```
void write (T depth,
    uint2 coord,
    uint array,
    uint lod=0)
```

The following built-in functions can be used to do a gather of four samples that would be used for bilinear interpolation when sampling a 2D depth texture array.

```
vec<T,4> gather(sampler s,
    float2 coord,
    uint array,
    int2 offset=int2 (0)) const
```

The following built-in functions can be used do a gather of four samples that would be used for bilinear interpolation when sampling a 2D depth texture array and comparing these samples with a specified comparison value.

```
vec<T,4> gather_compare(sampler s,
    float2 coord,
    uint array,
    float compare_value,
    int2 offset=int2 (0)) const
```

T must be a float type. The following built-in 2D depth texture array query functions are provided.

```
uint get_width (uint lod=0) const
uint get_height (uint lod=0) const
uint get_array_size ( ) const
uint get_num_mip_levels ( ) const
```

Cube-Map Depth Texture

The following data types and corresponding constructor functions are available to specify various sampling options:

```
bias(float value)
level(float lod)
gradientcube(float3 dPdx, float3 dPdy)
```

The following built-in functions can be used to sample from a cube-map depth texture.

```
T sample(sampler s,
    float3 coord) const
T sample(sampler s,
    float3 coord,
    lod_options options) const
``` lod_options must be one of the following types: bias, level or gradientcube. The following built-in functions can be used to sample from a cube-map depth texture and compare a single component against the specified comparison value

```
T sample_compare(sampler s,
    float3 coord,
    float compare_value) const
T sample_compare(sampler s,
    float3 coord,
    float compare_value,
    lod_options options) const
``` lod_options must be one of the following types: bias, level or gradientcube. T must be a float type. The following built-in functions can be used to write to a cube-map depth texture.

```
void write(T depth,
    uint2 coord,
    uint face,
    uint lod=0)
```

The following built-in functions can be used to do a gather of four samples that would be used for bilinear interpolation when sampling a cube-map depth texture.

```
vec<T,4> gather(sampler s,
    float3 coord) const
```

The following built-in functions can be used do a gather of four samples that would be used for bilinear interpolation when sampling a cube-map texture and comparing these samples with a specified comparison value.

```
vec<T,4> gather_compare(sampler s,
    float3 coord,
    float compare_value) const
```

T must be a float type. The following built-in cube-map depth texture query functions are provided.

```
uint get_width(uint lod=0) const
uint get_height(uint lod=0) const
uint get_num_mip_levels( ) const
```

Cube-Map Depth Texture Array [Optional]

The following built-in functions can be used to sample from a cube-map depth texture array.

```
T sample(sampler s,
    float3 coord,
    uint array) const
T sample(sampler s,
    float3 coord,
    uint array,
    lod_options options) const
``` lod_options must be one of the following types: bias, level, or gradientcube. The following built-in functions can be used to sample from a cube-map depth texture array and compare a single component against the specified comparison value

```
T sample_compare(sampler s,
    float3 coord,
    uint array,
    float compare_value) const
T sample_compare(sampler s,
    float3 coord,
    uint array,
    float compare_value,
    lod_options options) const
``` lod_options must be one of the following types: bias, level, or gradientcube. T must be a float type. The following built-in functions can be used to write to a cube-map depth texture array.

```
void write (T depth,
    uint2 coord,
    uint face,
    uint array,
    uint lod=0)
```

The following built-in functions can be used to do a gather of four samples that would be used for bilinear interpolation when sampling a cube-map depth texture array.

```
vec<T,4> gather(sampler s,
    float3 coord,
    uint array) const
```

The following built-in functions can be used do a gather of four samples that would be used for bilinear interpolation when sampling a cube-map depth texture array and comparing these samples with a specified comparison value.

```
vec<T,4> gather_compare(sampler s,
    float3 coord,
    uint array,
    float compare_value) const
```

T must be a float type. The following built-in cube-map depth texture array query functions are provided.

```
uint get_width (uint lod=0) const
uint get_height (uint lod=0) const
uint get_array_size ( ) const
uint get_num_mip_levels ( ) const
```

2D Multi-Sampled Depth Texture

The following built-in functions can be used to perform sampler-less reads from a 2D multi-sampled depth texture:

```
T read (uint2 coord,
    uint sample) const
```

The following built-in 2D multi-sampled depth texture query functions are provided.

```
uint get_width ( ) const
uint get_height ( ) const
uint get_num_samples ( ) const
```

Pack and Unpack Functions

This section lists the language functions for converting a vector floating-point data to and from a packed integer value. The functions are defined in the header <language_pack>. (The term "language" in "language_pack" may be replaced by a name for the compiler in one embodiment.) Refer to conversion sections below for details on how to convert from a 8-bit, 10-bit or 16-bit signed or unsigned integer value to a normalized single- or half-precision floating-point value and vice-versa.

Unpack Integer(s); Convert to a Floating-Point Vector

Table 23 (FIG. 28) lists functions that unpack multiple values from a single unsigned integer and then converts them into floating-point values that are stored in a vector.

Convert Floating-Point Vector to Integers, then Pack the Integers

Table 24 (FIG. 29) lists functions that start with a floating-point vector, converts the components into integer values, and then packs the multiple values into a single unsigned integer. The unpack_unorm2×16 to half and unpack_snorm2×16 to half functions may result in precision loss when converting from a 16-bit unorm or snorm value to a half precision floating point.

Atomic Functions

The programming language implements a subset of the C++ 11 atomics and synchronization operations. For atomic operations, only a memory_order of memory_order_relaxed is supported in one embodiment. The memory scope of these atomic operations is a work-group if the atomic operation is to local memory and is a device if the atomic operation is to global memory.

There are only a few kinds of operations on atomic types, although there are many instances of those kinds. This section specifies each general kind.

These are defined in the header <language_atomic>. (The term "language" in "language_atomic" may be replaced by a name for the compiler in one embodiment.) NOTE: For iOS, atomic operations to global memory can only be performed inside a kernel function (a function declared with the kernel qualifier) or inside a function called from a kernel function. For OS X, atomic operations to global memory can be performed by graphics and kernel functions.

The memory_order enum is defined as:

enum memory_order {memory_order_relaxed};

Only memory_order_relaxed is supported in one embodiment of the language.

Atomic Store Functions

These functions atomically replace the value pointed to by obj (*obj) with desired.

```
void    atomic_store_explicit(volatile    global
    atomic_int*obj,
    int desired,
    memory_order order)
void    atomic_store_explicit(volatile    global
    atomic_uint*obj,
    uint desired,
    memory_order order)
void atomic_store_explicit(volatile local atomic_int*obj,
    int desired,
    memory_order order)
void    atomic_store_explicit(volatile    local
    atomic_uint*obj,
    uint desired,
    memory_order order)
```

Atomic Load Functions

These functions atomically obtain the value pointed to by obj.

```
int atomic_load_explicit(volatile global atomic_int*obj,
    memory_order order)
uint    atomic_load_explicit(volatile    global
    atomic_uint*obj,
    memory_order order)
int atomic_load_explicit(volatile local atomic_int*obj,
    memory_order order)
uint atomic_load_explicit(volatile local atomic_uint*obj,
    memory_order order)
```

Atomic Exchange Functions

These functions atomically replace the value pointed to by obj with desired and return the value obj previously held.

```
int    atomic_exchange_explicit(volatile    global
    atomic_int*obj,
    int desired,
    memory_order order)
uint atomic_exchange_explicit(volatile global atomic_uint
    obj,
    uint desired,
    memory_order order)
int    atomic_exchange_explicit(volatile    local
    atomic_int*obj,
    int desired,
    memory_order order)
uint    atomic_exchange_explicit(volatile    local
    atomic_uint*obj,
    uint desired,
    memory_order order)
```

Atomic Compare and Exchange Functions

These functions atomically compare the value pointed to by obj with the value in expected. If those values are equal, the function replaces *obj with desired (by performing a read-modify-write operation). The function returns the value obj previously held.

```
bool atomic_compare_exchange_weak_explicit(
    volatile global atomic_int*obj,
    int*expected,
    int desired,
    memory_order succ,
    memory_order fail)
bool atomic_compare_exchange_weak_explicit(
    volatile global atomic_uint*obj,
    uint*expected,
    uint desired,
    memory_order succ,
    memory_order fail)
bool atomic_compare_exchange_weak_explicit(
    volatile local atomic_int*obj,
    int*expected,
    int desired,
    memory_order succ,
    memory_order fail)
bool atomic_compare_exchange_weak_explicit(
    volatile local atomic_uint*obj,
    uint*expected,
    uint desired,
    memory_order succ,
    memory_order fail)
```

Atomic Fetch and Modify functions

The following operations perform arithmetic and bitwise computations. All of these operations are applicable to an object of any atomic type. The key, operator, and computation correspondence is given in Table 25 (FIG. 30).

Atomically replaces the value pointed to by obj with the result of the computation of the value specified by key and arg. These operations are atomic read-modify-write operations. For signed integer types, arithmetic is defined to use two's complement representation with silent wrap-around on overflow. There are no undefined results. Returns the value obj held previously.

```
int atomic_fetch_key_explicit(
    volatile global atomic_int*obj,
    int arg,
    memory_order order)
uint atomic_fetch_key_explicit(
    volatile global atomic_uint*obj,
    uint arg,
    memory_order order)
int atomic_fetch_key_explicit(
    volatile local atomic_int*obj,
    int arg,
    memory_order order)
uint atomic_fetch_key_explicit(
    volatile local atomic_uint*obj,
    uint arg,
    memory_order order)
```

Compiler Options

The language compiler can be used online (i.e. using the appropriate APIs to compile the language sources) or offline. The language sources compiled offline can be loaded as binaries, using the appropriate APIs.

This chapter explains the compiler options supported by the language compiler according to one embodiment, which are categorized as pre-processor options, options for math intrinsics, options that control optimization, and miscellaneous options. The online and offline compiler support these options.

Pre-Processor Options

These options control a preprocessor that is run on each program source before actual compilation.

-D name

Predefine name as a macro, with definition 1.

-D name=definition

The contents of definition are tokenized and processed as if they appeared in a # define directive. This option may receive multiple options, which are processed in the order in which they appear. This option allows developers to compile the language code to change which features are enabled or disabled.

-I dir—Add the directory di r to the list of directories to be searched for header files. This option is only available for the offline compiler.

Math Intrinsics Options

These options control compiler behavior regarding floating-point arithmetic. These options tradeoff between speed and correctness.

-fdenorms

-fno-denorms (default)

These options control how single precision, half precision and double precision denormalized numbers are handled. By default denorms are flushed to zero. These compiler options enable or disable (default) denorm support.

The -f denorms option is ignored for single precision numbers if the device does not support single precision denormalized numbers. This option is ignored for half precision numbers if the device does not support half precision denormalized numbers.

This option is ignored for double precision numbers if the device does not support double precision These options only apply to scalar and vector floating-point variables and computations on these floating-point variables inside a program. They do not apply to sampling, reading from or writing to texture objects.

-ffast-math (default)

-fno-fast-math

These options enable (default) or disable the optimizations for floating-point arithmetic that may violate the IEEE 754 standard. They also enable or disable the high precision variant of math functions for single precision floating-point scalar and vector types.

Options Controlling the Language Version

The following option controls the version of unified graphics/compute language that the compiler accepts.

-std=

Determine the language revision to use. A value for this option must be provided. The possible values are:

ios-language10—support the unified graphics/compute language revision 1.0 programs for iOS.

osx-language10—support the unified graphics/compute language revision 1.0 programs for Mac OS X.

(The term "language" above may be replaced by a name for the compiler in one embodiment.)

Optional Features

When compiling the language source for a device, the following compiler options are used to identify the optional features to be enabled. These optional features are disabled by default.

-fnative-double

-fno-native-double (default)

Enable or disable (default) support for double-precision type and floating-point arithmetic operations.

If -std=ios-language10 the following optional features are available:

Framebuffer fetch which allows you to read colors from a color attachment in a fragment shader.

If -std=osx-language10 the following optional features are available:

Cubemap Arrays

Numerical Compliance

This chapter covers how the language represents floating-point numbers with regard to accuracy in mathematical operations. The language in one embodiment is compliant to a subset of the IEEE 754 standard.

INF, NaN and Denormalized Numbers

INF and NaNs must be supported for single precision and double precision floating-point numbers and are optional for half precision floating-point numbers. Support for signaling NaNs is not required.

Support for denormalized numbers with single precision and half precision floating-point is optional. Denormalized single or half precision floating-point numbers passed as input or produced as the output of single or half precision floating-point operations may be flushed to zero.

Double precision floating-point support is optional. If double precision is supported, support for denormalized numbers with double precision floating-point is required.

Rounding Mode

Either round to zero or round to nearest rounding mode may be supported for single precision and half precision floating-point operations. For devices that have full support for compute, round to nearest rounding mode is required for single precision floating-point operations.

For double precision floating-point, round to nearest rounding mode is required.

Floating-Point Exceptions

Floating-point exceptions are disabled in the language. The result of a floating-point exception must match the IEEE 754 specification for the exceptions not enabled case.

Relative Error as ULPs

Table 26 (FIGS. 31-32) describes the minimum accuracy of single-precision and double-precision floating-point basic arithmetic operations and math functions given as ULP values. The reference value used to compute the ULP value of an arithmetic operation is the infinitely precise result.

Table 27 (FIG. 33) describes the minimum accuracy of commonly used single-precision floating-point arithmetic operations given as ULP values with fast math enabled (which is the default unless -ffast-math-disable is specified as a compiler option). For the other math functions, the accuracy is as defined in Table 26 (FIGS. 31-32).

Edge Case Behavior in Flush to Zero Mode

If denormals are flushed to zero, then a function may return one of four results:

(1) Any conforming result for non-flush-to-zero mode.

(2) If the result given by (1) is a subnormal before rounding, it may be flushed to zero.

(3) Any non-flushed conforming result for the function if one or more of its subnormal operands are flushed to zero.

(4) If the result of (3) is a subnormal before rounding, the result may be flushed to zero.

In each of the above cases, if an operand or result is flushed to zero, the sign of the zero is undefined.

Texture Addressing and Conversion Rules

The texture coordinates specified to the sample, sample_compare, gather, gather_compare, read, and write functions cannot be INF or NaN. In addition, the texture coordinate must refer to a region inside the texture for the texture read and write functions. In the sections that follow, we discuss conversion rules that are applied when reading and writing textures in a graphics or kernel function.

Conversion Rules for Normalized Integer Pixel Data Types

In this section, we discuss converting normalized integer pixel data types to floating-point values and vice-versa.

Converting Normalized Integer Pixel Data Types to Floating-Point Values

For textures that have 8-bit, 10-bit or 16-bit normalized unsigned integer pixel values, the texture sample and read functions convert the pixel values from an 8-bit or 16-bit unsigned integer to a normalized single or half-precision floating-point value in the range [0.0 . . . 1.0].

For textures that have 8-bit or 16-bit normalized signed integer pixel values, the texture sample and read functions convert the pixel values from an 8-bit or 16-bit signed integer to a normalized single or half-precision floating-point value in the range [−1.0 . . . 1.0].

These conversions are performed as listed in the second column of Table 28 (FIG. 34). The precision of the conversion rules are guaranteed to be <=1.5 ulp except for the cases described in the third column.

Converting Floating-Point Values to Normalized Integer Pixel Data Types

For textures that have 8-bit, 10-bit or 16-bit normalized unsigned integer pixel values, the texture write functions convert the single or half-precision floating-point pixel value to an 8-bit or 16-bit unsigned integer.

For textures that have 8-bit or 16-bit normalized signed integer pixel values, the texture write functions convert the single or half-precision floating-point pixel value to an 8-bit or 16-bit signed integer.

The preferred methods to perform conversions from floating-point values to normalized integer values are listed in Table 29 (FIG. 35).

The GPU may choose to approximate the rounding mode used in the conversions described above. If a rounding mode other than round to nearest even is used, the absolute error of the implementation dependent rounding mode vs. the result produced by the round to nearest even rounding mode must be <=0.6.

Conversion Rules for Half Precision Floating-Point Pixel Data Type

For textures that have half-precision floating-point pixel color values, the conversions from half to float are lossless. Conversions from float to half round the mantissa using the round to nearest even or round to zero rounding mode. Denormalized numbers for the half data type which may be generated when converting a float to a half may be flushed to zero. A float NaN must be converted to an appropriate NaN in the half type. A float INF must be converted to an appropriate INF in the half type.

Conversion Rules for Floating-Point Channel Data Type

The following rules apply for reading and writing textures that have single-precision floating-point pixel color values.

NaNs may be converted to a NaN value(s) supported by the device.

Denorms may be flushed to zero.

All other values must be preserved.

Conversion Rules for Signed and Unsigned Integer Pixel Data Types

For textures that have 8-bit or 16-bit signed or unsigned integer pixel values, the texture sample and read functions return a signed or unsigned 32-bit integer pixel value. The conversions described in this section must be correctly saturated.

Writes to these integer textures perform one of the conversions listed in Table 30 (FIG. 36).

Conversion Rules for sRGBA and sBGRA Textures

Conversion from sRGB space to linear space is automatically done when sampling from an sRGB texture. The conversion from sRGB to linear RGB is performed before the filter specified in the sampler specified when sampling the texture is applied. If the texture has an alpha channel, the alpha data is stored in linear color space.

Conversion from linear to sRGB space is automatically done when writing to an sRGB texture. If the texture has an alpha channel, the alpha data is stored in linear color space.

The following is the conversion rule for converting a normalized 8-bit unsigned integer sRGB color value to a floating-point linear RGB color value (call it c) as per rules described above.

if (c<=0.04045),
    result=c/12.92;
else
    result=powr((c+0.055)/1.055, 2.4);

The resulting floating point value, if converted back to an sRGB value without rounding to a 8-bit unsigned integer value, must be within 0.5 ulp of the original sRGB value.

The following are the conversion rules for converting a linear RGB floating-point color value (call it c) to a normalized 8-bit unsigned integer sRGB value.

if (isnan(c)) c=0.0;
if (c>1.0)
    c=1.0;
else if (c<0.0)
    c=0.0;
else if (c<0.0031308)
    c=12.92*c;
else
    c=1.055*powr(c, 1.0/2.4)−0.055;
convert to integer scale i.e. c=c*255.0
convert to integer:
    c=c+0.5
    drop the decimal fraction, and the remaining floating-point(integral) value is converted directly to an integer.

The precision of the above conversion should be such that fabs(reference result−integer result)<=

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine-readable medium, on which are stored instructions, comprising instructions that, when executed, cause a programmable device to:
    receive via a developer system, at a target system, an application, wherein the application comprises a programming language independent linked intermediate representation, wherein the linked intermediate representation is linked with a library on the developer system, wherein the library includes both shader type functions and compute type functions, and wherein the application does not include source code instructions; and
    compile, on the target system, the linked intermediate representation to yield graphics processor unit (GPU) native code for the target system when the application creates, prior to runtime, graphics pipeline objects that comprise state information and one or more shaders for rendering graphics.

2. The non-transitory machine-readable medium of claim 1, wherein the library further comprises:
    geometric shader functions;
    kernel thread group synchronization functions;
    fragment shader functions;
    texture functions;
    atomic functions;
    matrix functions;
    integer functions;
    relational functions;
    mathematical functions; and
    pack and unpack functions.

3. The non-transitory machine-readable medium of claim 2, wherein the texture functions comprise:
    functions that, when executed, perform sampling from a texture, sampler-less reading from a texture, writing to a texture, and querying a texture by the GPU, and
    wherein template arguments for a texture type identify a color type returned when reading from or writing to a texture and how the texture is to be accessed.

4. The non-transitory machine-readable medium of claim 2, wherein the texture functions comprise texture functions for one-dimensional textures, two-dimensional textures, three-dimensional textures, and cube-map textures.

5. The non-transitory machine-readable medium of claim 2, wherein the fragment shader functions comprise functions for computation of derivatives, sampler functions, and flow-control functions.

6. A non-transitory machine-readable medium, on which are stored instructions, comprising instructions that, when executed, cause a programmable device to:
    compile, on a target system, a linked intermediate representation received via a developer system, to yield graphics processor unit (GPU) native code for the target system when an application creates, prior to runtime, graphics pipeline objects that comprise state information and one or more shaders for rendering graphics,
    wherein the linked intermediate representation is generated by use of a compiler, on the developer system, to parse and compile source code written in a predetermined programming language to generate an intermediate representation that is machine independent, and then link the intermediate representation that is part of the application with a library on the developer system, and
    wherein the library includes both shader type functions and compute type functions.

7. The non-transitory machine-readable medium of claim 6, wherein parsing the source code on the developer system comprises enforcing matching of elements in a fragment input type with elements in a vertex output type.

8. The non-transitory machine-readable medium of claim 6, wherein parsing the source code on the developer system comprises enforcing matching of per-instance vertex outputs with per-instance fragment inputs.

9. The non-transitory machine-readable medium of claim 6, wherein the predetermined programming language complies with a language model that provides both graphics programs and compute data-parallel tasks for execution on a graphics processor.

10. The non-transitory machine-readable medium of claim 9, wherein the language model comprises: shader and kernel function qualifiers that restrict how a function may be used.

11. The non-transitory machine-readable medium of claim 10, wherein graphics functions may be declared with a shader function qualifier and either computer or graphics functions may be declared with a kernel function qualifier.

12. The non-transitory machine-readable medium of claim 11, wherein the language model further comprises:
attribute qualifiers that identify a location of a resource to use for a function argument; and
sampling and interpolation qualifiers for return types of vertex functions and arguments to fragment functions.

13. The non-transitory machine-readable medium of claim 9, wherein the language model further comprises scalar, vector, and matrix data types.

14. The non-transitory machine-readable medium of claim 9, wherein the language model further provides a qualifier for identifying per-vertex and per-fragment input.

15. The non-transitory machine-readable medium of claim 9, wherein the language model further provides for specification of per-vertex input, and wherein the language model further uses a vertex identifier for reading from and writing to a buffer in a vertex function.

16. An apparatus comprising:
a processor included in a target system;
a memory included in the target system;
a compiler, stored in the memory and executable on the processor of the target system; and
instructions stored in the memory that, when executed, by the processor, cause the target system to compile a linked intermediate representation received a developer system to yield graphics processor unit (GPU) native code for the target system when an application creates, prior to runtime, graphics pipeline objects that contain state information and one or more shaders for rendering graphics,
wherein the linked intermediate representation is generated by use of a compiler, on the developer system, to parse and compile source code written in a predetermined programming language to generate an intermediate representation that is machine independent, and then link the intermediate representation that is part of the application with a library on the developer system, and
wherein the library includes both shader type functions and compute type functions.

17. The apparatus of claim 16, wherein the compiler on the developer system is configured to enforce matching of elements in a fragment input type with elements in a vertex output type.

18. The apparatus of claim 16, wherein the compiler on the developer system is configured to enforce matching of per-instance vertex outputs with per-instance fragment inputs.

19. The apparatus of claim 16, wherein the predetermined programming language complies with a language model that provides both graphics shader programs and compute data-parallel tasks for execution on a GPU, and wherein the language model comprises address space qualifiers that specify a region of memory where a function variable or argument is allocated.

20. The apparatus of claim 16, wherein the predetermined programming language complies with a language model that provides both graphics shader programs and compute data-parallel tasks for execution on a GPU, and wherein the language model comprises shader and kernel function qualifiers that restrict how a function may be used.

* * * * *

UNITED STATES PATENT AND TRADEMARK OFFICE
CERTIFICATE OF CORRECTION

PATENT NO.         : 10,747,519 B2
APPLICATION NO.    : 16/532637
DATED              : August 18, 2020
INVENTOR(S)        : Aaftab A. Munshi et al.

It is certified that error appears in the above-identified patent and that said Letters Patent is hereby corrected as shown below:

Claim 16, at Column 51, Line 33, Insert -- via -- before "a"

Signed and Sealed this
Twentieth Day of October, 2020

Andrei Iancu
*Director of the United States Patent and Trademark Office*